United States Patent
Emura

(10) Patent No.: US 9,555,332 B2
(45) Date of Patent: Jan. 31, 2017

(54) INFORMATION PROCESSING APPARATUS, INFORMATION PROCESSING METHOD AND INFORMATION PROCESSING PROGRAM

(71) Applicant: Rakuten, Inc., Shinagawa-ku, Tokyo (JP)

(72) Inventor: Sadaaki Emura, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 289 days.

(21) Appl. No.: 14/372,610

(22) PCT Filed: Apr. 22, 2013

(86) PCT No.: PCT/JP2013/061770
§ 371 (c)(1),
(2) Date: Jul. 16, 2014

(87) PCT Pub. No.: WO2014/064955
PCT Pub. Date: May 1, 2014

(65) Prior Publication Data
US 2014/0364181 A1    Dec. 11, 2014

(30) Foreign Application Priority Data
Oct. 26, 2012    (JP) .................................. 2012-236753

(51) Int. Cl.
*A63F 13/816*    (2014.01)
*A63F 13/58*    (2014.01)
*G06Q 50/34*    (2012.01)

(52) U.S. Cl.
CPC ............. *A63F 13/58* (2014.09); *A63F 13/816* (2014.09); *G06Q 50/34* (2013.01)

(58) Field of Classification Search
CPC ...... G07F 17/32; G07F 17/3288; A63F 13/58; A63F 13/65; A63F 13/816; G06Q 50/34
(Continued)

(56) References Cited

U.S. PATENT DOCUMENTS 4,875,164 A * 10/1989 Monfort .............. G07F 17/3288
235/381
5,212,636 A * 5/1993 Nakazawa ............. G06Q 50/34
340/323 R
(Continued)

FOREIGN PATENT DOCUMENTS

JP    2001-052097 A    2/2001
JP    2009-259180 A    11/2009

OTHER PUBLICATIONS

International Search Report for PCT/JP2013/061770 dated Jul. 16, 2013.

*Primary Examiner* — Allen Chan
(74) *Attorney, Agent, or Firm* — Sughrue Mion, PLLC

(57) ABSTRACT

It is an object of the present invention to enable predictions helpful to viewers to be preferentially presented. An information processing apparatus accepts dopester's purchase of a voting ticket for voting a race target participating in a race. The information processing apparatus accepts a prediction of the dopester for a race for which purchase of a voting ticket is accepted, the prediction including a race target predicted by the dopester. The information processing apparatus determines a coincidence between a promising bet of a race target of a voting ticket whose purchase is accepted and a prediction accepted by the prediction acceptance means per dopester. The information processing apparatus determines a prediction of which of a first dopester and a second dopester is preferentially presented to viewers based on coincidences determined for the first dopester and the second dopester, respectively.

9 Claims, 12 Drawing Sheets

| RACE | ◎ | ○ | ▲ | △ | DOPESTER | PREDICTION HIT RATE | PREDICTION RECOVERY RATE | DETAILS | RELIABILITY |
|---|---|---|---|---|---|---|---|---|---|
| 11R | 13 | 4 | 1 | 14 | U2 | 71.4% | 26.7% | DETAILS | HIGH |
| 11R | 4 | 13 | 1 | 14 | U1 | 72.7% | 55.4% | DETAILS | LOW |
| 11R | 12 | 14 | 7 | 6 | U3 | 68.2% | 87.1% | DETAILS | MIDDLE |
| 11R | 5 | 4 | 14 | 13 | U4 | 63.6% | 100.1% | DETAILS | HIGH |
| 11R | 4 | 1 | 11 | 13 | U5 | 60.2% | 72.7% | DETAILS | MIDDLE |
| 11R | 4 | 13 | 11 | 12 | U6 | 59.3% | 75.0% | DETAILS | MIDDLE |
| 11R | 4 | 13 | 11 | 3 | U7 | 58.0% | 68.4% | DETAILS | LOW |
| 11R | 4 | 3 | 12 | 14 | U9 | 56.5% | 63.7% | DETAILS | MIDDLE |
| 11R | 11 | 4 | 1 | 3 | U10 | 55.9% | 68.4% | DETAILS | MIDDLE |
| 11R | 4 | 3 | 6 | 13 | U8 | 56.8% | 108.6% | DETAILS | LOW |

PREDICTION LIST
XX RACETRACK LIST OF 11R 10 OUT OF 50
NEXT>

(58) Field of Classification Search
USPC .............................................................. 463/6
See application file for complete search history.

(56) References Cited

U.S. PATENT DOCUMENTS 5,326,104 A * 7/1994 Pease ..................... A63F 3/081
                                                               273/269
6,244,596 B1 * 6/2001 Kondratjuk ............. A63F 3/081
                                                               273/138.2

* cited by examiner

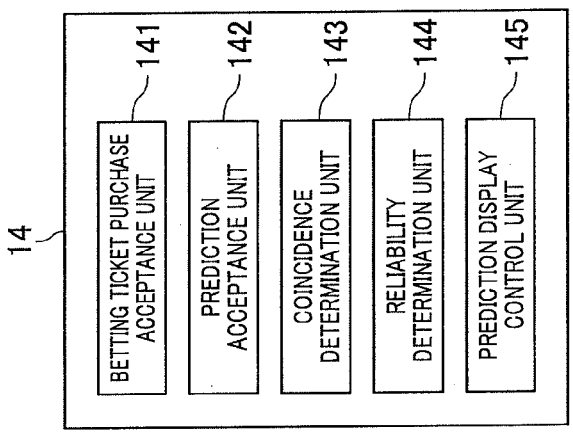
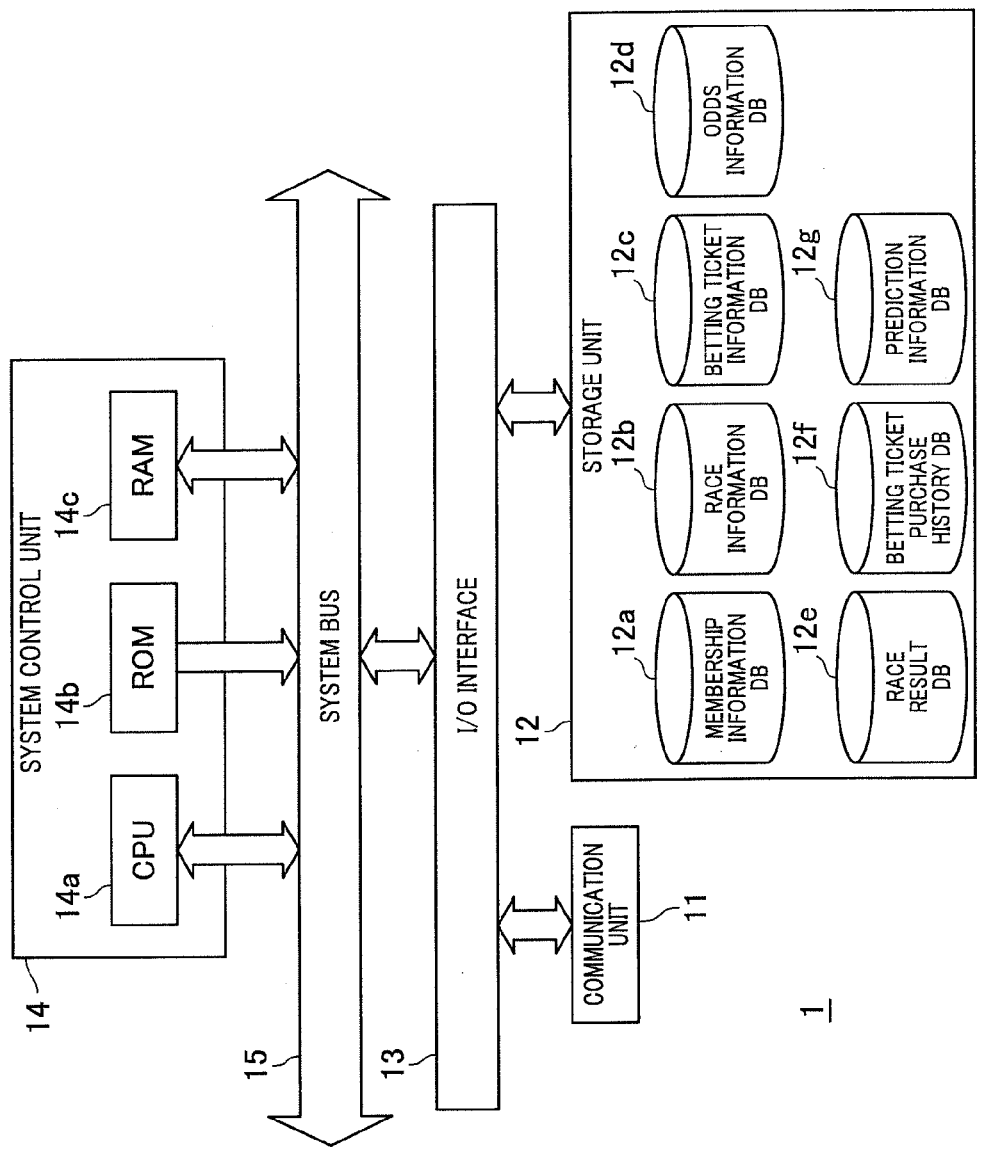

FIG.3(a)

12a — MEMBER INFORMATION DB

| USER ID |
|---|
| PASSWORD |
| NICKNAME |
| NAME |
| DATE OF BIRTH |
| SEX |
| ZIP CODE |
| ADDRESS |
| PHONE NUMBER |
| E-MAIL ADDRESS |
| CREDIT CARD INFORMATION |
| PREDICTION HIT RATE |
| PREDICTION RECOVERY RATE |
| . . . |

FIG.3(b)

12b — RACE INFORMATION DB

| RACE ID |
|---|
| RACE NAME |
| RACETRACK NAME |
| DATE |
| STARTING TIME |
| RACE NUMBER |
| PARTICIPATING HORSE INFORMATION |
| . . . |

FIG.3(c)

12c — BETTING TICKET INFORMATION DB

| RACE ID |
|---|
| BETTING TICKET ID |
| BETTING TICKET SELECTION |
| HORSE NUMBER/BRACKET NUMBER |
| . . . |

FIG.3(d)

12d — ODDS INFORMATION DB

| RACE ID |
|---|
| BETTING TICKET ID |
| UPDATE TIME |
| ODDS |
| . . . |

FIG.3(e)

12e — RACE RESULT DB

| RACE ID |
|---|
| PLACING ORDER INFORMATION |
| HIT BETTING TICKET INFORMATION |
| . . . |

FIG.3(f)

12f — BETTING TICKET PURCHASE HISTORY DB

| USER ID |
|---|
| PURCHASE DATE/TIME |
| RACE ID |
| BETTING TICKET ID |
| BETTING TICKET SELECTION |
| HORSE NUMBER/BRACKET NUMBER |
| PURCHASE QUANTITY |
| . . . |

FIG.3(g)

12g — PREDICTION INFORMATION DB

| USER ID |
|---|
| REGISTRATION DATE/TIME |
| RACE ID |
| HORSE NUMBER OF FAVORITE |
| HORSE NUMBER OF RIVAL |
| HORSE NUMBER OF DARK HORSE |
| HORSE NUMBER OF LOWER LEVEL |
| . . . |

FIG.4(a)

COMPLETE COINCIDENCE

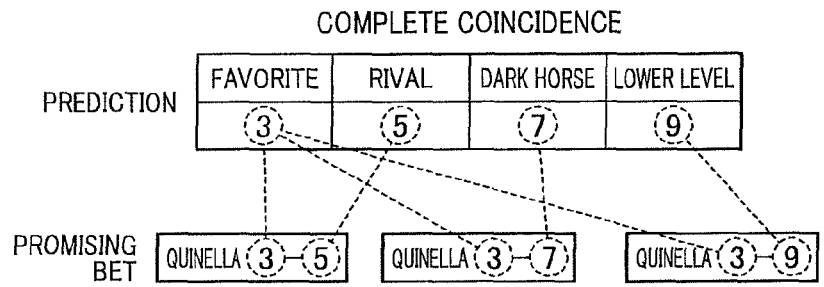

FIG.4(b)

PARTIAL COINCIDENCE WHEN ALL PROMISING BETS INCLUDE PREDICTED HORSE,
AND ALL PREDICTED HORSES ARE INCLUDED IN PROMISING BETS

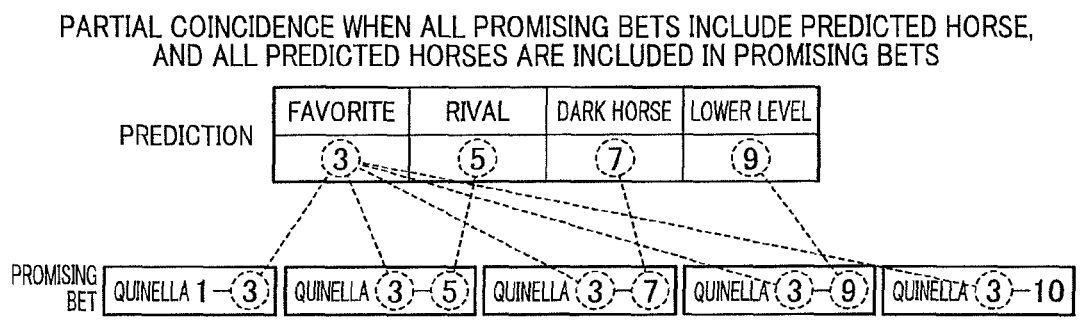

FIG.4(c)

PARTIAL COINCIDENCE WHEN ALL PROMISING BETS INCLUDE PREDICTED HORSE,
AND ALL PROMISING BETS ARE MADE OF PREDICTED HORSES ONLY

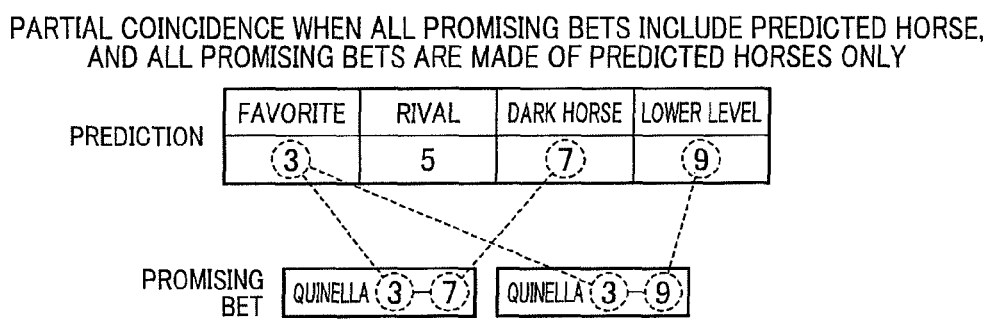

FIG.4(d)

ANY OTHER THAN ABOVE CASES, AND PARTIAL COINCIDENCE
WHEN ALL PROMISING BETS INCLUDE PREDICTED HORSE

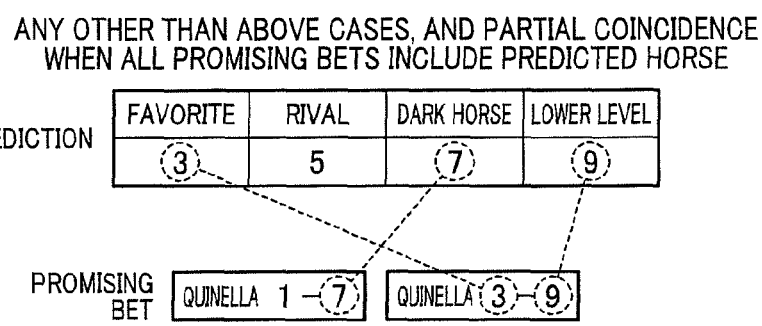

FIG.5(a)

COMPLETE NON-COINCIDENCE, AND PURCHASE OF PROMISING BETS WHOSE ODDS INCREASE AFTER PREDICTION

| PREDICTION | FAVORITE | RIVAL | DARK HORSE | LOWER LEVEL |
|---|---|---|---|---|
| | 3 | 5 | 7 | 9 |

PROMISING BET: QUINELLA 1 − 2    QUINELLA 1 − 4

ODDS ON PREDICTION REGISTRATION (13:00)   10.0TIMES    12.5TIMES

ODDS ON PURCHASE (15:00)   13.5TIMES    15.2TIMES

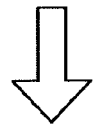

QUINELLA 1-2 HITS

FIG.5(b)

| COINCIDENCE STATE AND OTHERS | | | COINCIDENCE | RELIABILITY |
|---|---|---|---|---|
| COMPLETE COINCIDENCE | | | MAXIMUM | MAXIMUM |
| PARTIAL COINCIDENCE | ALL PROMISING BETS INCLUDE PREDICTED HORSE | ALL PREDICTED HORSES ARE INCLUDED IN PROMISING BETS OR ALL PROMISING BETS INCLUDE ONLY PREDICTED HORSES | HIGH | HIGH |
| | | OTHER CASE | MIDDLE | MIDDLE |
| | PARTIAL PROMISING BETS DO NOT INCLUDE PREDICTED HORSE | PROMISING BET NOT INCLUDING PREDICTED HORSE DOES NOT HITS | LOW | BETWEEN MIDDLE AND LOW |
| | | PROMISING BET NOT INCLUDING PREDICTED HORSE HITS | | LOW |
| COMPLETE NON-COINCIDENCE | PURCHASE PROMISING BET WHOSE ODDS INCREASE AFTER PREDICTION | | MINIMUM | BETWEEN LOW AND MINIMUM |
| | OTHER CASE | | | MINIMUM |

FIG.6(a)

| 2012/12/1 XX RACETRACK DAILY PROGRAM | | | | |
|---|---|---|---|---|
| BRACKET NUMBER | HORSE NUMBER | SIRE NAME | PREVIOUS 5 RACES | RESULT |

PREDICTION LIST (100a)

| RACE | ◎ | ○ | ▲ | △ | DOPESTER | PREDICTION HIT RATE | PREDICTION RECOVERY RATE | DETAILS | | RELIABILITY |
|---|---|---|---|---|---|---|---|---|---|---|
| 11R | 5 | 4 | 14 | 13 | U43 | 51.7% | 80.4% | DETAILS | | MIDDLE |
| 11R | 5 | 4 | 14 | 13 | U4 | 63.6% | 100.1% | DETAILS | | HIGH |
| 11R | 2 | 4 | 6 | 10 | U14 | 67.7% | 101.2% | DETAILS | | LOW |
| 11R | 2 | 3 | 6 | 9 | U26 | 25.3% | 68.5% | DETAILS | | HIGH |
| 11R | 10 | 6 | 13 | 2 | U21 | 39.7% | 67.7% | DETAILS | | HIGH |

FIG.6(b)

PREDICTION LIST (100b)
XX RACETRACK LIST OF 11R 10 OUT OF 50

| RACE | ◎ | ○ | ▲ | △ | DOPESTER | PREDICTION HIT RATE | PREDICTION RECOVERY RATE | DETAILS | RELIABILITY |
|---|---|---|---|---|---|---|---|---|---|
| 11R | 13 | 4 | 1 | 14 | U2 | 71.4% | 26.7% | DETAILS | HIGH |
| 11R | 4 | 13 | 1 | 14 | U1 | 72.7% | 55.4% | DETAILS | LOW |
| 11R | 12 | 14 | 7 | 6 | U3 | 68.2% | 87.1% | DETAILS | MIDDLE |
| 11R | 5 | 4 | 14 | 13 | U4 | 63.6% | 100.1% | DETAILS | HIGH |
| 11R | 4 | 1 | 11 | 13 | U5 | 60.2% | 72.7% | DETAILS | MIDDLE |
| 11R | 4 | 13 | 11 | 12 | U6 | 59.3% | 75.0% | DETAILS | MIDDLE |
| 11R | 4 | 13 | 11 | 3 | U7 | 58.0% | 68.4% | DETAILS | LOW |
| 11R | 4 | 3 | 12 | 14 | U9 | 56.5% | 63.7% | DETAILS | MIDDLE |
| 11R | 11 | 4 | 1 | 3 | U10 | 55.9% | 68.4% | DETAILS | MIDDLE |
| 11R | 4 | 3 | 6 | 13 | U8 | 56.8% | 108.6% | DETAILS | LOW |

NEXT>

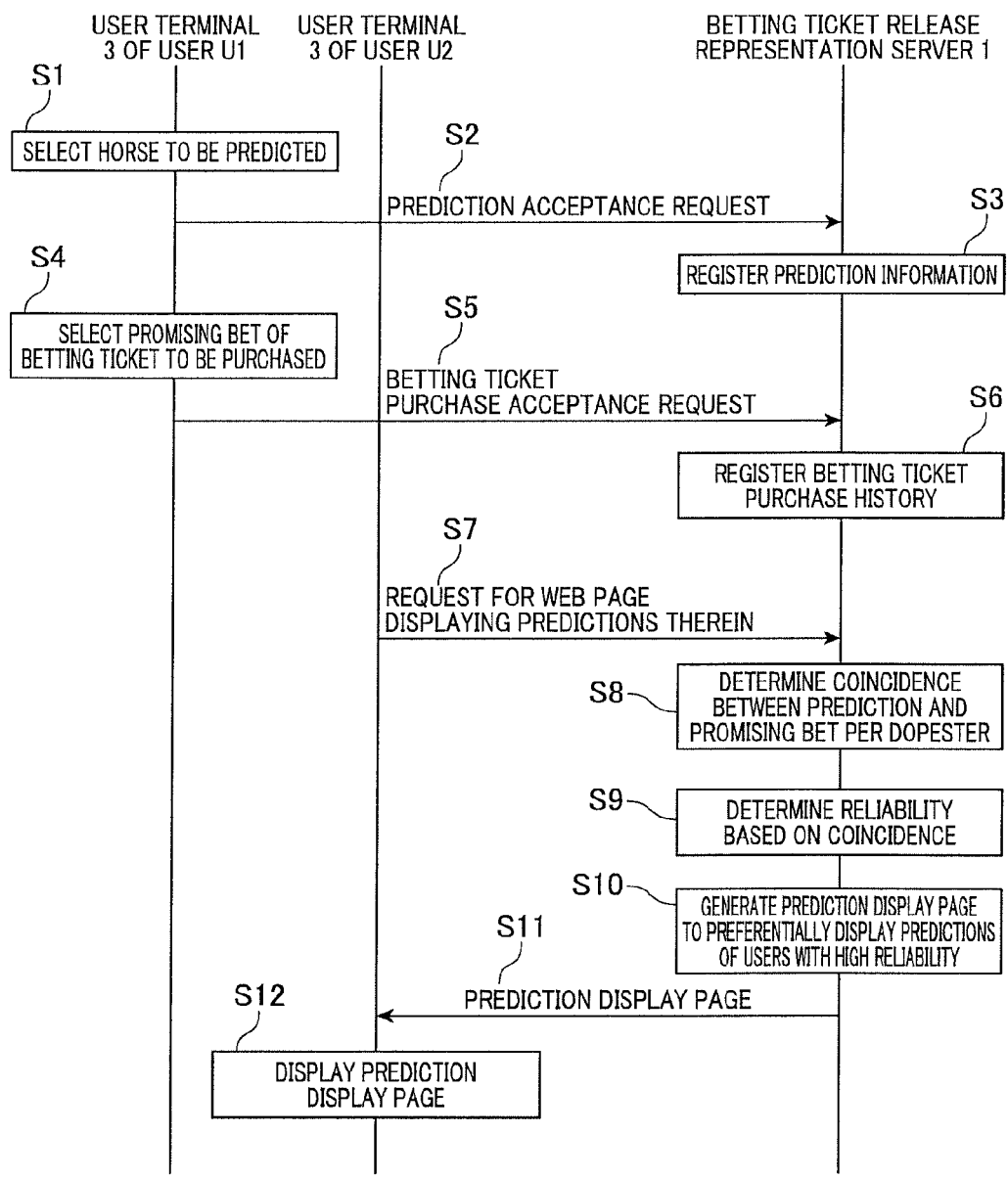

INFORMATION PROCESSING APPARATUS, INFORMATION PROCESSING METHOD AND INFORMATION PROCESSING PROGRAM

CROSS REFERENCE TO RELATED APPLICATIONS

This application is a National Stage of International Application No. PCT/JP2013/061770 filed Apr. 22, 2013, claiming priority based on Japanese Patent Application No. 2012-236753 filed Oct. 26, 2012, the contents of all of which are incorporated herein by reference in their entirety.

TECHNICAL FIELD

The present invention relates to a technical field of presenting predictions of a race for which voting tickets are sold.

BACKGROUND ART

For example, Patent Document 1 discloses therein a technique for enabling voting tickets of a public race to be purchased. Further, Patent Document 2 discloses therein a system for accepting input of dopester's predictions of a race to be served for voting ticket purchase determination by prediction viewers.

CITATION LIST

Patent Documents

Patent Document 1: JP 2001-052097 A
Patent Document 2: JP 2009-259180 A

SUMMARY OF INVENTION

Technical Problem to be Solved by the Invention

With the technique described in Patent Literature 2, however, an economic burden is not placed on a dopester even if his/her prediction is not right. Thus, a dopester may post a prediction without a will of right prediction. A prediction with a will of right prediction is more helpful for viewers than a prediction without the will if recovery rates or hit rates are equivalent.

The present invention has been made in terms of the above viewpoint, and it is an object thereof to provide an information processing apparatus, an information processing method and an information processing program capable of preferentially presenting helpful predictions to viewers.

Solution to the Problem

In order to achieve the above described problems, an invention described in claim 1 is characterized in that the invention comprising: a purchase acceptance means that accepts dopester's purchase of a voting ticket for voting a race target participating in a race; a prediction acceptance means that accepts a prediction of the dopester for a race for which purchase of a voting ticket is accepted by the purchase acceptance means, the prediction including a race target predicted by the dopester; a coincidence determination means that determines, per dopester, a coincidence between a promising bet of a race target of a voting ticket whose purchase is accepted by the purchase acceptance means and a prediction accepted by the prediction acceptance means; and a presentation control means that determines a prediction of which of a first dopester and a second dopester is preferentially presented to viewers based on coincidences determined for the first dopester and the second dopester by the coincidence determination means, respectively.

According to this invention, a coincidence between a promising bet of a race target of a voting ticket purchased by a dopester and a prediction of the dopester is determined for the same race. Then, a prediction of any dopester is preferentially presented to viewers ahead of a prediction of other dopester based on the coincidence determined per dopester. An economic burden is placed on a dopester in order to purchase a voting ticket. Therefore, there is probability that a dopester purchases a voting ticket which he/she thinks to hit. Thus, as a coincidence between promising bet and prediction is higher, there is probability that the dopester thinks to make a great prediction. Thus, predictions helpful to viewers can be preferentially presented.

An invention described in claim 2 is characterized in that the information processing apparatus according to claim 1, further comprising a reliability determination means that determines reliability of a dopester based on coincidences determined by the coincidence determination means based on promising bets and predictions of voting tickets of past races, and that increases reliability as the coincidence is higher, wherein, in the case where information on predictions of a race started in the future is presented, the presentation control means preferentially presents a prediction of the dopester with higher reliability out of the first dopester and the second dopester whose reliability is determined by the reliability determination means ahead of a prediction of the other dopester.

According to this invention, reliability of a dopester who makes a prediction is determined based on coincidences between promising bets of voting tickets and predictions for past races, and reliability is determined as higher as a coincidence is higher. Then, when predictions of a race held in the future are presented, a prediction of a dopester with higher reliability is preferentially presented ahead of a prediction of a dopester with lower reliability. Thus, even if a dopester who predicts a race held in the future does not purchase a voting ticket of the race, predictions helpful to viewers can be preferentially presented.

An invention described in claim 3 is characterized in that the information processing apparatus according to claim 1 or claim 2, wherein, in the case where all of one or more race targets included in a promising bet of each of one or more purchased voting tickets are included in one or more predicted race targets and each of one or more predicted race targets is included in at least any promising bet of one or more purchased voting tickets, the coincidence determination means increase the coincidence up to the highest.

According to this invention, a prediction of a dopester who purchases his/her expected voting ticket can be preferentially presented.

An invention described in claim 4 is characterized in that the information processing apparatus according to any one of claims 1 to 3, wherein when at least one of one or more predicted race targets is included in a promising bet of each of one or more purchased voting tickets, the coincidence determination means increases the coincidence in any case of a case that all of one or more race targets included in a promising bet of each of one or more purchased voting tickets are included in one or more predicted race targets and a case that each of one or more predicted race targets is included in at least any promising bet of one or more purchased voting tickets than other cases.

A prediction of a dopester who purchases a voting ticket including his/her predicted race target in a promising bet of each of one or more voting tickets is considered as having a will of making a certain prediction. At this time, in the case where all of one or more race targets included in a promising bet of each of one or more voting tickets are included in one or more predicted race targets, there is probability that the dopester has a will of making a great prediction than other cases. Also in the case where each of one or more predicted race targets is included in at least any promising bet of one or more purchased voting tickets, there is probability that the dopester has a will of making a great prediction. Thus, according to this invention, a prediction with dopester's will of making a measurable prediction can be preferentially presented among the predictions which may be made with a will of making a certain prediction.

An invention described in claim 5 is characterized in that the information processing apparatus according to any one of claims 1 to 4, wherein when at least one of one or more predicted race targets is included in a promising bet of each of one or more purchased voting tickets, the coincidence determination means increases the coincidence as a rate at which one or more predicted race targets are included in promising bets of one or more purchased voting tickets is higher.

A prediction of a dopester who purchases a voting ticket including his/her predicted race target in a promising bet of each of one or more voting tickets is considered as having a will of making a certain prediction. At this time, as a rate at which one or more predicted race targets are included in promising bets of one or more purchased voting tickets is higher, there is probability that the dopester has a will of making a certain prediction. Thus, according to this invention, a prediction of a dopester with a will of making a measurable prediction can be preferentially presented among predictions with dopester's will of making a certain prediction.

An invention described in claim 6 is characterized in that the information processing apparatus according to claim 2, further comprising: a time acquisition means that acquires a voting ticket purchase time and a prediction acceptance time; and an odds acquisition means that acquires odds at the time of the voting ticket purchase and odds at the time of the prediction acceptance, wherein when a promising bet of a purchased voting ticket does not include any one or more predicted race targets, the reliability determination means lowers the reliability in the case where a voting ticket is purchased after a prediction is accepted and that odds of the voting ticket at the time of the purchase are higher than odds of the voting ticket at the time of the prediction acceptance than other cases.

It is assumed that there is a dopester who intentionally increases odds of a voting ticket which he/she is going to purchase. In this case, the dopester posts, as a predicted race target, a race target so different from a promising bet of a voting ticket to be purchased. The dopester who confirms an increase in odds of the desired voting ticket through the presented prediction purchases the voting ticket. This dopester does not have a will of making a prediction hit, and the dopester is not reliable. According to this invention, when a promising bet of a purchased voting ticket does not include any one or more predicted race targets, reliability of the dopester who purchases the voting ticket after the prediction is accepted and the odds of the voting ticket increases after the prediction is accepted is determined as lower than in the case where the voting ticket is purchased before the prediction is accepted or in the case where odds of the voting ticket at the time of the purchase are not higher than odds of the voting ticket at the time of the acceptance of the prediction. Thus, other predictions can be preferentially presented ahead of a prediction of a dopester who has probability to intentionally increase odds of a voting ticket which he/she purchases.

An invention described in claim 7 is characterized in that the information processing apparatus according to claim 6, wherein the reliability determination means lowers the reliability in the case where a voting ticket which is purchased after a prediction is accepted and whose odds at the time of the purchase are higher than odds at the time of the prediction acceptance hits than in the case where the voting ticket does not hit.

According to this invention, other predictions can be preferentially presented ahead of a prediction of a dopester who has probability to intentionally increase odds of a voting ticket which he/she purchases and to make a bad prediction.

An invention described in claim 8 is characterized in that an information processing method performed by a computer, the method comprising: a purchase acceptance step of accepting dopester's purchase of a voting ticket for voting a race target participating in a race; a prediction acceptance step of accepting a prediction of the dopester for a race for which purchase of a voting ticket is accepted in the purchase acceptance step, the prediction including a race target predicted by the dopester; a coincidence determination step of determining, per dopester, a coincidence between a promising bet of a race target of a voting ticket whose purchase is accepted in the purchase acceptance step and a prediction accepted in the prediction acceptance step; and a presentation control step of determining a prediction of which of a first dopester and a second dopester is preferentially presented to viewers based on coincidences determined for the first dopester and the second dopester in the coincidence determination step, respectively.

An invention described in claim 9 is characterized in that causing a computer to function as: a purchase acceptance means that accepts dopester's purchase of a voting ticket for voting a race target participating in a race; a prediction acceptance means that accepts a prediction of the dopester for a race for which purchase of a voting ticket is accepted by the purchase acceptance means, the prediction including a race target predicted by the dopester; a coincidence determination means that determines, per dopester, a coincidence between a promising bet of a race target of a voting ticket whose purchase is accepted by the purchase acceptance means and a prediction accepted by the prediction acceptance means; and a presentation control means that determines a prediction of which of a first dopester and a second dopester is preferentially presented to viewers based on coincidences determined for the first dopester and the second dopester by the coincidence determination means, respectively.

Effects of the Invention

According to the present invention, a coincidence between a promising bet of a race target of a betting ticket purchased by a dopester and a prediction of the dopester is determined for the same race. Then, a prediction of any dopester is preferentially presented to viewers ahead of predictions of other dopesters based on the coincidence determined per dopester. An economic burden is placed on a dopester in order to purchase a betting ticket. Therefore, there is probability that a dopester purchases a betting ticket which he/she thinks to hit. Thus, as a coincidence between promising bet and prediction is higher, there is probability that the dopester thinks to make a great prediction. Thus, predictions helpful to viewers can be preferentially presented.

BRIEF DESCRIPTION OF THE DRAWINGS

FIG. 2(a) is a block figure illustrating one exemplary outline structure of a betting ticket release representation server 1 according to one embodiment.

FIG. 2(b) is a figure illustrating exemplary functional blocks of the betting ticket release representation server 1 according to one embodiment.

FIG. 3(a) is a figure illustrating exemplary contents registered in a member information DB 12a.

FIG. 3(b) is a figure illustrating exemplary contents registered in a race information DB 12b.

FIG. 3(c) is a figure illustrating exemplary contents registered in a betting ticket information DB 12c.

FIG. 3(d) is a figure illustrating exemplary contents registered in an odds information DB 12d.

FIG. 3(e) is a figure illustrating exemplary contents registered in a race result DB 12e.

FIG. 3(f) is a figure illustrating exemplary contents registered in a betting ticket purchase history DB 12f.

FIG. 3(g) is a figure illustrating exemplary contents registered in a prediction information DB 12g.

FIGS. 4(a) to 4(d) are figures illustrating exemplary predictions and promising bets.

FIG. 5(a) is a figure illustrating exemplary prediction and promising bets.

FIG. 5(b) is a figure illustrating one exemplary list of reliability.

FIG. 6(a) is a figure illustrating one exemplary daily program page.

FIG. 6(b) is a figure illustrating one exemplary prediction list page.

FIG. 7 is a sequence figure illustrating exemplary processings of the information processing system S according to one embodiment.

MODES FOR CARRYING OUT THE INVENTION

An embodiment according to the present invention will be described below in detail with reference to the drawings. The embodiment described later is where the present invention is applied to an information processing system by which a user purchases a betting ticket (winning horse voting ticket) via Internet betting in a horse race. Horse participating in a race is one exemplary race target according to the present invention. A betting ticket is one exemplary voting ticket according to the present invention. A race to which the present invention is applicable is not limited to a horse race. The present invention can be applied to any race for which voting tickets can be purchased. Such races include public races such as bicycle race, motorboat race and motorcycle race, for example.

[1. Structure and Functional Outline of Information Processing System]

Figure 1:
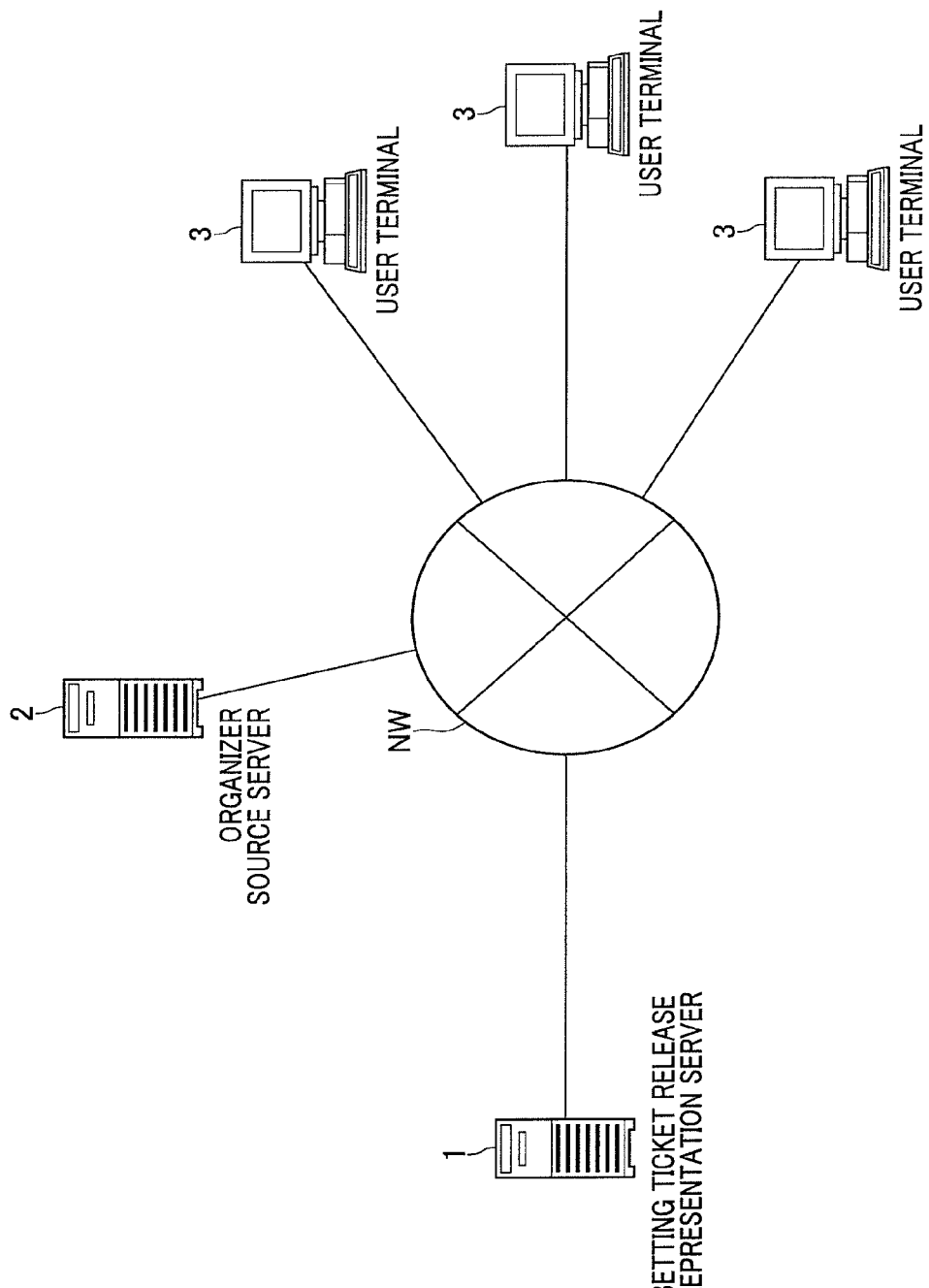
FIG. 1 is a figure illustrating one exemplary outline structure of an information processing system S according to one embodiment.

A structure of the information processing system S according to the present embodiment will be first described with reference to FIG. 1. FIG. 1 is a figure illustrating one exemplary outline structure of the information processing system S according to the present embodiment.

As illustrated in FIG. 1, the information processing system S includes and is constructed by betting ticket release representation server 1, an organizer source server 2, and a plurality of user terminals 3. Then, the betting ticket release representation server 1, the organizer source server 2 and each user terminal 3 can mutually exchange data via a network NW by use of a communication protocol such as TCP/IP, for example. The network NW is constructed by Internet, a dedicated communication line (such as CATV (Community Antenna Television) line), a mobile communication network (including base stations and the like), a gateway, or the like, for example.

The betting ticket release representation server 1 is a server apparatus for performing various processings for a horse race site in which betting tickets are sold instead of the organizer of the horse races. The betting ticket release representation server 1 is one exemplary information processing apparatus according to the present invention. The betting ticket release representation server 1 acquires information on a race announced by the organizer from the organizer source server 2. Further, the betting ticket release representation server 1 transmits a Web page in response to a request from the user terminal 3. Thereby, the betting ticket release representation server 1 provides the information on the races, and the like. The information to be provided includes daily programs, odds, predictions, race results, and the like. Further, the betting ticket release representation server 1 performs, for example, a processing of accepting purchase of betting tickets, or a processing of making refund for hit betting tickets. The user of the horse race site selects promising bets or the number of tickets to be purchased when purchasing betting tickets. The promising bets include betting ticket selections (betting method), and participating horses or brackets to be voted. The participating horses or brackets to be voted are designated by horse numbers or bracket numbers. The promising bets also include an order of placing of each participating horse to be bet in addition to a combination of horse numbers in a betting ticket selection for predicting an order of placing.

The betting ticket release representation server 1 accepts user's prediction of a race based on a request from the user terminal 3. When registering a prediction, the user selects favorite, rival, dark horse and lower level as participating horses to be predicted in higher orders of placing. A participating horse selected as any of favorite, rival, dark horse and lower level is called predicted horse. The betting ticket release representation server 1 distributes a Web page displaying the accepted predictions therein to the user terminal 3. The Web page is called prediction display page. Each user can purchase betting tickets with reference to the predictions displayed in the prediction display page. A user who registers his/her prediction is one exemplary dopester according to the present invention. A user who views the predictions displayed in the prediction display page is one exemplary viewer according to the present invention. According to the present embodiment, a user of a horse race site may be any of a dopester and a viewer.

The organizer source server 2 is a server apparatus installed for providing information on races or issuing betting tickets by the organizer of the horse races. The organizer source server 2 transmits information on races to the betting ticket release representation server 1. For example, the organizer source server 2 transmits information on odds to the betting ticket release representation server 1 at predetermined time intervals (such as intervals of 1 minute).

The user terminal 3 is a terminal apparatus of a user utilizing a horse race site. The user terminal 3 accesses the betting ticket release representation server 1 based on user's operation thereby to receive and display a Web page from the betting ticket release representation server 1. The user terminal 3 incorporates therein software such as browser, e-mail client or the like. The user terminal 3 employs a personal computer, PDA (Personal Digital Assistant), a portable information terminal such as a Smartphone, a cell phone, or the like.

[2. Structure of Betting Ticket Release Representation Server]

A structure of the betting ticket release representation server 1 will be described below with reference to FIGS. 2(a), 2(b) and FIGS. 3(a) to 3(g).

FIG. 2(a) is a block figure illustrating one exemplary outline structure of the betting ticket release representation server 1 according to the present embodiment. As illustrated in FIG. 2(a), the betting ticket release representation server 1 comprises a communication unit 11, a storage unit 12, an I/O interface 13 and a system control unit 14. The system control unit 14 is connected to the I/O interface 13 via a system bus 15.

The communication unit 11 is connected to the network NW to control a communication state with the user terminals 3 and the like.

The storage unit 12 is configured of a hard disc drive or the like, for example. The storage unit 12 constructs therein databases such as a member information DB 12a, a race information DB 12b, a betting ticket information DB 12c, an odds information DB 12d, a race result DB 12e, a betting ticket purchase history DB 12f and a prediction information DB 12g. "DB" is short for a database.

FIG. 3(a) is a figure illustrating exemplary contents registered in the member information DB 12a. The member information DB 12a registers therein member information on the users registered in a horse race site per user in an associated manner. Specifically, the member information DB 12a registers therein user attributes such as user ID, password, nickname, name, date of birth, sex, zip code, address, phone number, e-mail address, prediction hit rate and prediction recovery rate in an associated manner. User ID is user identification information. Prediction hit rate and prediction recovery rate are of user's prediction hit rate and prediction recovery rate of past races. For example, when the winner and the second place are the predicted horses, the system control unit 14 may determine that the prediction hits.

FIG. 3(b) is a figure illustrating exemplary contents registered in the race information DB 12b. The race information DB 12b registers race information on races per race therein. Specifically, the race information DB 12b registers therein information on race ID, race name, racetrack name, date, starting time, race number, participating horses' information in an associated manner. Race ID is race identification information. Participating horses' information is information on horses participating in races. For example, participating horses' information sets therein bracket number, horse number, horse name, age, weight, jockey's name and the like per participating horse.

FIG. 3(c) is a figure illustrating exemplary contents registered in the betting ticket information DB 12c. The betting ticket information DB 12c registers therein betting ticket information on betting tickets to be sold per betting ticket. Specifically, the betting ticket information DB 12c registers therein race ID, betting ticket ID, betting ticket selection, number of the vote target and the like in an associated manner. Betting ticket ID is identification information of the betting ticket. Race ID indicates which race a betting ticket indicated by a betting ticket ID is of. number of the vote target is a horse number or bracket number. One or a plurality of numbers of the vote target are registered according to a betting ticket selection. A combination of betting ticket selection and bet number indicates a promising bet.

FIG. 3(d) is a figure illustrating exemplary contents registered in the odds information DB 12d. The odds information DB 12d registers therein odds information on odds of betting tickets per betting ticket at predetermined time intervals. Specifically, the odds information DB 12d registers therein race ID, betting ticket ID, update time, odds and the like in an associated manner. The odds information is transmitted from the organizer source server 2 to the betting ticket release representation server 1 at predetermined time intervals. The system control unit 14 registers the received odds information in the odds information DB 12d. Update time indicates the date/time when odds of a betting ticket indicated by a betting ticket ID are updated by the organizer source server 2.

FIG. 3(e) is a figure illustrating exemplary contents registered in the race result DB 12e. The race result DB 12e registers therein race result information on races' results per race. Specifically, the race result DB 12e registers therein race ID, placing order information, hit betting ticket information and the like in an associated manner. Placing order information indicates an order of placing of each participating horse in a race. For example, the placing order information sets therein an order of placing and a horse number per participating horse. The hit betting ticket information is information on hit betting tickets. For example, the hit betting ticket information sets therein betting ticket IDs and final odds of hit betting tickets in an associated manner per betting ticket. The betting ticket release representation server 1 transmits corresponding race result information to the betting ticket release representation server 1 when a race finishes and the race result is fixed.

FIG. 3(f) is a figure illustrating exemplary contents registered in the betting ticket purchase history DB 12f. The betting ticket purchase history DB 12*f* registers therein a history of user's purchase of betting tickets as betting ticket purchase history per purchase betting ticket. Specifically, the betting ticket purchase history DB 12*f* registers therein user ID, purchase date/time, race ID, betting ticket ID, betting ticket selection, number of the vote target, purchase quantity and the like in an associated manner. User ID indicates a user who purchases a betting ticket. Purchase date/time indicates the date/time when a purchased betting ticket is accepted. Betting ticket ID indicates a betting ticket purchased by the user. A combination of race ID, betting ticket ID, betting ticket selection and number of the vote target is the same as a combination of race ID, betting ticket ID, betting ticket selection and number of the vote target registered in the betting ticket information DB 12*c*.

FIG. 3(*g*) is a figure illustrating exemplary contents registered in the prediction information DB 12*g*. The prediction information DB 12*g* registers therein prediction information indicating user's predictions of races each time the betting ticket release representation server 1 accepts a prediction. Specifically, the prediction information DB 12*g* registers therein user ID, registration date/time, race ID, horse number of favorite, horse number of rival, horse number of dark horse, horse number of lower level, and the like in an associated manner. User ID indicates a user who makes a prediction. The user may select horse numbers of only some of favorite, rival, dark horse and lower level and may register a prediction. Registration date/time indicates the date/time when a prediction is accepted. Race ID indicates which race an accepted prediction is of.

Next, other information stored in the storage unit 12 will be explained. The storage unit 12 stores therein various items of data such as HTML documents for displaying Web pages, XML (Extensible Markup Language) documents, image data, text data and electronic documents. The storage unit 12 stores therein various setting values, thresholds, constants and the like.

Further, the storage unit 12 stores therein various programs such as operating system, WWW (World Wide Web) server program, DBMS (Database Management System) and betting ticket release representation management program. The betting ticket release representation management program is directed for performing the processings of such as accepting purchase of betting tickets, refunding, accepting predictions and controlling prediction display. The betting ticket release representation management program is one exemplary information processing program according to the present invention. Further, various programs may be acquired from other server apparatus or the like via the network NW, or may be recorded in a recording medium such as DVD (Digital Versatile Disc) and read via a drive apparatus. Further, the betting ticket release representation management program may be a program product.

The I/O interface 13 performs an interface processing between the communication unit 11 and the storage unit 12, and the system control unit 14.

The system control unit 14 is configured of a CPU 14*a*, a ROM (Read Only Memory) 14*b*, a RAM (Random Access Memory) 14*c*, and the like. The CPU 14*a* reads and executes various programs so that the system control unit 14 as a computer performs various processing for a horse race site.

Further, the betting ticket release representation server 1 may be configured of a plurality of server apparatuses. For example, a server apparatus for performing the processings of such as accepting purchase of betting tickets and refunding, a server apparatus for performing the processings of such as accepting predictions and controlling prediction display, a server apparatus for transmitting Web pages in response to a request from the user terminal 3, a server apparatus for managing the databases, and the like may be mutually connected via LAN or the like.

[3. Detailed Functions of System Control Unit]

FIG. 2(*b*) is a figure illustrating exemplary functional blocks of the betting ticket release representation server 1 according to the present embodiment. As illustrated in FIG. 2(*b*), the system control unit 14 functions as a betting ticket purchase acceptance unit 141, a prediction acceptance unit 142, a coincidence determination unit 143, a reliability determination unit 144 and a prediction display control unit 145. The betting ticket purchase acceptance unit 141 is one exemplary purchase acceptance means according to the present invention. The prediction acceptance unit 142 is one exemplary prediction acceptance means according to the present invention. The coincidence determination unit 143 is one exemplary coincidence determination means according to the present invention. The reliability determination unit 144 is one exemplary reliability determination means, one exemplary time acquisition means and one exemplary odds acquisition means according to the present invention. The prediction display control unit 145 is one exemplary presentation control means according to the present invention.

The user can select an arbitrary participating horse as a predicted horse when registering his/her prediction. Therefore, the user can register an unreliable prediction in looking from the situations of other users. A reliable prediction is a prediction with user's will of right prediction. Thus, the system control unit 14 controls such that a prediction with user's will of right prediction is preferentially displayed on a Web page displaying predictions therein. Specifically, the system control unit 14 employs user's prediction, and promising bets of user-purchased betting tickets of the same race. The system control unit 14 determines coincidences between the promising bets and the prediction. The system control unit 14 determines which user's prediction among the users who make predictions is to be referentially displayed to the users who view the predictions based on the coincidences determined per user who makes a prediction. The system control unit 14 may preferentially display users' predictions with a higher coincidence ahead of other users' predictions. That is, the system control unit 14 may determine that a higher coincidence indicates higher reliability. Thereby, the system control unit 14 can preferentially display the predictions with users' will of right prediction.

A coincidence between promising bet and prediction indicates how one or more participating horses contained in the promising bets coincide with one or more predicted horses. An economic (financial) burden is placed on the user in order to purchase betting ticket. Thus, the user generally selects promising bets the user wishing to hit and purchases their betting tickets. Thus, it is assumed that as a coincidence is higher, the user has a stronger will of right prediction. As a coincidence is higher, a betting ticket is more likely not to hit when the prediction does not hit. Therefore, it can be assumed that a user who makes a prediction with a higher coincidence is in more charge in the prediction's result. The system control unit 14 may determine reliability of a user who makes a prediction based on a coincidence. Then, the system control unit 14 may preferentially display more reliable users' predictions. A higher coincidence indicates higher reliability.

The betting ticket purchase acceptance unit 141 accepts user's purchase of betting tickets. Specifically, the betting ticket purchase acceptance unit 141 acquires a betting ticket selling request transmitted from the user terminal 3 to the betting ticket release representation server 1 via the communication unit 11. A betting ticket purchase acceptance request is a message indicating a betting ticket selling request. The betting ticket purchase acceptance unit 141 registers a betting ticket purchase history in the betting ticket purchase history DB 12*f* based on the betting ticket purchase acceptance request.

The prediction acceptance unit 142 accepts user's race prediction. Specifically, the prediction acceptance unit 142 acquires a prediction acceptance request transmitted from the user terminal 3 to the betting ticket release representation server 1 via the communication unit 11. The prediction acceptance request is a message indicating a prediction acceptance request. The prediction acceptance unit 142 registers prediction information in the prediction information DB 12*g* based on the prediction acceptance request.

The coincidence determination unit 143 determines, in the same user of the same race, a coincidence between a promising bet of the purchased betting ticket accepted by the betting ticket purchase acceptance unit 141 and a prediction accepted by the prediction acceptance unit 142. A specific coincidence determination method will be described with reference to FIGS. 4(*a*) to 4(*d*). FIGS. 4(*a*) to 4(*d*) are the figures illustrating exemplary predictions and promising bets. There will be described below an example in which a certain user U1 selects 3, 5, 7 and 9 as favorite, rival, dark horse and lower level, respectively.

FIG. 4(*a*) illustrates an example in which promising bets completely coincide with a prediction. Complete coincidence indicates a state that each of all the predicted horses is included in at least one promising bet and all the promising bets include only the predicted horses. For example, the example illustrated in FIG. 4(*a*) is an exemplary case in which the user U1 purchases the betting tickets of quinellas 3-5, 3-7 and 3-9. In the case of determining as complete coincidence, the betting ticket release representation server 1 also determines that the coincidence is the highest.

Other than complete coincidence, the coincidence states include partial coincidence and complete non-coincidence. Partial coincidence indicates that at least one predicted horse is included in at least one promising bet, but is not complete coincidence. Complete non-coincidence indicates that no promising bet includes a predicted horse. Partial coincidence is lower in its coincidence than complete coincidence and complete non-coincidence is lower in its coincidence than partial coincidence.

Partial coincidence is classified into a case where all promising bets include a predicted horse and a case where partial promising bets do not include a predicted horse. The case where all promising bets include a predicted horse indicates a type of partial coincidence and that each of all promising bets includes at least one predicted horse. The case where partial promising bets do not include a predicted horse indicates a type of partial coincidence and that all promising bets do not include a predicted horse. That is, at least one promising bet does not include a predicted horse. The case where all promising bets include a predicted horse is higher in its coincidence than the case where partial promising bets do not include a predicted horse. This is because in the case where all promising bets include a predicted horse, the user selects at least one predicted horse for each promising bet and purchases a betting ticket and thus the user is considered as having a will of making a right prediction.

The case where all promising bets include a predicted horse is further classified into a plurality of states.

FIGS. 4(*b*) to 4(*d*) illustrate an exemplary case where all promising bets include a predicted horse. FIG. 4(*b*) illustrates a case in which all predicted horses are included in at least one promising bet. In the example of FIG. 4(*b*), the user U1 purchases the betting tickets of quinellas 1-3, 3-5, 3-7, 3-9 and 3-10 respectively. Each of the horse numbers 3, 5, 7 and 9 of the predicted horses is included in at least one promising bet of the purchased betting tickets.

FIG. 4(*c*) illustrates an exemplary case in which all promising bets include only predicted horses. In the example of FIG. 4(*c*), the user U1 purchases the betting tickets of quinellas 3-7 and 3-9 respectively. All the horse numbers 3, 7 and 9 included in the promising bets of the purchased voting tickets are the horse numbers of the predicted horses.

FIG. 4(*d*) illustrates an exemplary case in which at least one predicted horse is not included in any promising bet and at least one promising bet includes a participating horse other than the predicted horses. That is, FIG. 4(*d*) illustrates an exemplary state other than the states illustrated in FIG. 4(*b*) and FIG. 4(*c*). In the example of FIG. 4(*d*), the user U1 purchases the betting tickets of quinellas 1-7 and 3-9 respectively. The horse number 5 of the predicted horse is not included in any promising bet, and the promising bet 1-7 includes the horse number 1 of a participating horse which is not a predicted horse.

The case of FIG. 4(*b*) and the case of FIG. 4(*c*) are higher in coincidence than the case of FIG. 4(*d*). This is because in the case of FIG. 4(*b*) or FIG. 4(*c*), the user bets all the predicted horses or the user bets only predicted horses and thus the user is considered as having a will of making a right prediction as compared with the case of FIG. 4(*d*).

By the way, there is an issue as to how a race whose predictions are to be displayed is controlled in its prediction display by use of coincidences between promising bets and predictions of which race. A race whose predictions are to be displayed is called target race. For example, the coincidence determination unit 143 may use coincidences between promising bets and predictions of a target race. The coincidence determination unit 143 may use coincidences between promising bets and predictions of past races when a race to be started in the future is a target race. In this case, a prediction of a user who registers the prediction of the target race but does not purchase a betting ticket of the target race can be controlled in its display. The users who do not purchase betting tickets of the target race include a user who is thinking about purchasing a betting ticket of the target race later. The coincidence determination unit 143 may limit the races for which coincidences are determined among the past races by a period of the races. For example, the coincidence determination unit 143 may limit to only the races held today, or may limit to only the races held within such as predetermined days, predetermined months or predetermined years before today. The coincidence determination unit 143 may use both coincidences between promising bets and predictions of a target race, and coincidences between promising bets and predictions of past races.

By way of one example, according to the present embodiment, in the case where a user who predicts a target race purchases a betting ticket of the target race, the coincidence determination unit 143 uses coincidences between promising bets and prediction of the target race. On the other hand, in the case where the user who predicts the target race does not purchase a betting ticket of the target race, the coincidence determination unit 143 uses coincidences between promising bets and predictions of past races.

Further, the betting ticket selections other than quinella employ the same coincidence determination method as for quinella. In the case of a betting ticket selection for selecting an order of placing, the coincidence determination unit 143 may not consider the orders of placing.

In the present embodiment, the prediction acceptance unit 142 accepts a prediction in which horse numbers of predicted horses are selected. Thus, the coincidence determination unit 143 determines coincidences between promising bets and prediction in the betting ticket selection of selecting a horse number. However, the prediction acceptance unit 142 may accept the prediction of selecting the bracket number predicted by a user. Then, the coincidence determination unit 143 may determine coincidences between promising bets and prediction in the betting ticket selection of selecting a bracket number.

In the case where the coincidence determination unit 143 determines coincidences between promising bets and predictions of past races, the reliability determination unit 144 determines reliability based on this coincidences. The reliability determination unit 144 determines that reliability is higher as a coincidence is higher. Thereby, even if a user who predicts a race held in the future does not purchase a betting ticket of the race, the system control unit 14 can preferentially present the prediction of the user who has probability to have a will of making a great prediction. For example, the reliability determination unit 144 may use a coincidence as reliability or may make a value of a coincidence and a value of reliability corresponding to the coincidence different. In the case of determining coincidences in a plurality of past races for a certain user, the reliability determination unit 144 determines reliability based on a plurality of the coincidences. For example, the reliability determination unit 144 may employ an average value of the plurality of the coincidences as reliability. In the present embodiment, the reliability determination unit 144 determines reliability of a user who makes predicts also based on coincidences between promising bets and prediction of a target race for convenience.

The reliability determination unit 144 may determine reliability based on other factors in addition to coincidence. For example, there is the case that each user may purchase a betting ticket with reference to other users' predictions, and thus odds may vary depending on the predictions displayed in a Web page. Therefore, a user may register his/her prediction such that odds of a betting ticket which the user wants to purchase is high. FIG. 5(*a*) is a figure illustrating an example of such a case. The user U1 selects, as horse numbers of predicted horses, horse numbers so different from the horse numbers included in the promising bets of the betting tickets which he/she wants to purchase. For example, the user U1 actually predicts the horse numbers 1, 2 and 4 of the participating horses. The user U1 is assumed to purchase the betting tickets of quinellas 1-2 and 1-4. On the other hand, the user U1 selects the horse numbers 3, 5, 7 and 9 of the predicted horses. Then, the prediction of the user U1 is displayed on a Web page. Therefore, the odds of the betting tickets of the promising bets including the participating horses predicted by the user U1 may lower. Thereby, the odds of the betting tickets which the user U1 wants to purchase may increase. In the example of FIG. 5(*a*), the odds of the betting tickets of quinellas 1-2 and 1-4 when the prediction is registered are 10.0 times and 12.5 times, respectively. After the prediction is registered, the odds increase up to 13.5 times and 15.2 times, respectively. The user U1 who confirms the increase in odds purchases the betting tickets of quinellas 1-2 and 1-4. Such a prediction of the user is not reliable.

Then, in complete non-coincidence between promising bets and prediction, in the case where the user registers his/her prediction and then purchases a betting ticket and that the odds at the time of the purchased betting ticket on the purchase are higher than the odds at the time the registration of the prediction, the reliability determination unit 144 lowers reliability than in the case where the user purchases a betting ticket and then registers his/her prediction or that the odds at the time of the purchased betting ticket on the purchase are not higher than the odds at the time of the registration of the prediction. A coincidence in complete non-coincidence is very low, and thus reliability is also low. The reliability further lowers.

The reliability determination unit 144 may further lower reliability only in the case where the betting ticket which the user purchases hits in addition to the above conditions. This is because the user has probability to have a will of making a great prediction of the betting ticket and thus the user has probability to make a non-great prediction.

In the case where partial promising bets do not include a predicted horse, the reliability determination unit 144 may lower reliability in the case where at least one of the betting tickets of the promising bets not including a predicted horse hits than in the case where a betting ticket of a promising bet not including a predicted horse does not hit.

FIG. 5(*b*) is a summary of the above description. FIG. 5(*b*) is a figure illustrating relationships between coincidence state as well as other factor and coincidence as well as reliability. The highest coincidence is complete coincidence (see FIG. 4(*a*)). The second highest coincidence is in the case where all promising bets include a predicted horse and all predicted horses are included in at least one promising bet (see FIG. 4(*b*)), and the case where all promising bets include a predicted horse and all promising bets include only predicted horses (see FIG. 4(*c*)). The third highest coincidence is in the case where all promising bets include a predicted horse, at least one predicted horse is not included in any promising bet and at least one promising bet includes a participating horse other than predicted horses (see FIG. 4(*d*)). The fourth highest coincidence is in the case where partial promising bets do not include a predicted horse. The lowest coincidence is complete non-coincidence. The order of reliability is basically the same as the order of coincidence. In the case where partial promising bets do not include a predicted horse, reliability changes based on whether a betting ticket of a promising bet not including a predicted horse hits. In the case of the complete non-coincidence, reliability changes based on a relationship between a betting ticket purchase date/time and a prediction registration date/time, and a relationship between odds at the time of the betting ticket purchase and odds at the time of the prediction registration (and based on whether the betting ticket hits).

If the user who makes a prediction does not purchase a betting ticket, the coincidence determination unit 143 cannot determine a coincidence. In this case, the reliability determination unit 144 sets predetermined reliability. A manager of the horse race site can freely set a value of the reliability at this time. Reliability when a coincidence cannot be determined is lower than reliability in complete coincidence, and higher than reliability in complete non-coincidence and in the case where the user registers his/her prediction and then purchases a betting ticket and the odds at the time of the betting ticket purchase are higher than the odds at the time of the prediction registration. Reliability when a coincidence cannot be determined may be 0 indicating neither reliable nor non-reliable.

The prediction display control unit 145 generates a prediction display page in which predictions of a race are displayed, and transmits the prediction display page to the user terminal 3. The prediction display control unit 145 transmits a HTML document of the prediction display page to the user terminal 3 thereby to present the predictions to the user via the user terminal 3. Further, the prediction display control unit 145 controls display of the predictions in the prediction display page based on reliability determined by the reliability determination unit 144. Specifically, the prediction display control unit 145 preferentially displays the predictions of the users with higher reliability ahead of the predictions of other users among the users whose reliability is determined. Basically, a higher coincidence is more reliable, and thus the prediction display control unit 145 preferentially displays the predictions of the users with higher coincidences ahead of the predictions of other users.

The prediction display page may be a daily program page, for example. The daily program page is a Web page in which a daily program is displayed. FIG. 6(a) is a figure illustrating an exemplary daily program page. As illustrated in FIG. 6(a), the daily program page displays therein a prediction list region 100a in addition to a daily program of a target race. The prediction list region 100a is where a list of predetermined predictions among all the predictions registered for the target race is displayed. Specifically, the prediction list region 100a displays a plurality of predictions 110 therein. In the example of FIG. 6(a), five predictions 110 are displayed. The prediction 110 contains horse numbers of each of favorite, rival, dark horse and lower level, nickname of users who predicted, prediction hit rate, prediction recovery rate, and the like. The prediction hit rate and the prediction recovery rate are of a hit rate and a recovery rate of predictions in past races. For example, each time a daily program page is displayed, the predictions 110 to be displayed change. The prediction display control unit 145, for example, may frequently display the predictions of users with higher reliability in the daily program page. FIG. 6(a) indicates reliability on the right side of each prediction 110 for a convenient description. For convenience of the description, the reliability indicated in FIG. 6(a) is at three stages of high, middle and low. Three predictions with high reliability are displayed, and one prediction with middle reliability and one prediction with low reliability are displayed respectively. A prediction of a user with higher reliability is more frequently displayed, and thus predictions with higher reliability tend to be more frequently displayed than predictions with lower reliability.

The prediction display page is a prediction list page, for example. The prediction list page is a Web age in which a list of predictions of a target race is displayed. FIG. 6(b) is a figure illustrating an exemplary displayed prediction list page. As illustrated in FIG. 6(b), the prediction list page displays therein a prediction list region 100b. The prediction list region 100b displays therein the predictions 110 from the top in descending order of the past prediction hit rates or recovery rates of the users who predicted, for example. In the example of FIG. 6(b), the predictions 110 are displayed in descending order of hit rate. The order of displayed predictions 110 is called display order. The prediction display control unit 145 may increase a display order of a prediction of a user with higher reliability among a plurality of predictions with equivalent hit rates or recovery rates, for example. This is because a prediction with user's will of making a great prediction is more helpful to the users who view the predictions than a prediction without the will among the users' predictions with equivalent hit rates or recovery rates. The manager can freely determine a range of hit rate or recovery rate determined as equivalent.

In the example of FIG. 6(b), the orders of prediction hit rate of the users U1 and U2 are the first and the second, respectively. Thus, usually the display order of the prediction of the user U1 is the first and the display order of the prediction of the user U2 is the second. However, the prediction hit rate of the user U1 is nearly equal to the prediction hit rate of the user U2, the reliability of the user U1 is high, and the reliability of the user U2 is low. Thus, the display order of the prediction of the user U1 is the second and the display order of the prediction of the user U2 is the first. Further, the orders of prediction hit rate of the users U8 to U10 are the eighth to the tenth, and the prediction hit rates of the users U8 to U10 are nearly equal. On the other hand, reliability of the user U8 is low, and reliability of the users U9 and U10 is middle. Thus, the display order of the prediction of the user U8 is the tenth, the display order of the prediction of the user U9 is the eighth, and the display order of the prediction of the user U10 is the ninth.

The prediction display control unit 145 may control prediction display in the prediction display page based on coincidences determined by the coincidence determination unit 143. The control method using a coincidence is the same as the control method using reliability. In this case, the reliability determination unit 144 is not required.

[4. Operations of Information Processing System]

The operations of the information processing system S will be described below with reference to FIG. 7 and FIG. 11. FIG. 7 is a sequence figure illustrating exemplary processings of the information processing system S according to the present embodiment.

The user U1 operates the user terminal 3 to register his/her prediction of a race held in the future. Specifically, the user U1 selects the horse numbers of favorite, rival, dark horse and lower level in a Web page for prediction registration (step S1). Then, when the user U1 selects a registration button on the Web page, the user terminal 3 of the user U1 transmits a prediction acceptance request to the betting ticket release representation server 1 (step S2). The prediction acceptance request contains user ID of the user U1, race ID of race being a target to be predicted, horse number of each predicted horse. When the betting ticket release representation server 1 receives the prediction acceptance request, the prediction acceptance unit 142 acquire a present date/time as registration date/time. The prediction acceptance unit 142 generates prediction information containing information set in the prediction acceptance request and the registration date/time. Then, the prediction acceptance unit 142 registers the prediction information in the prediction information DB 12g (step S3).

Thereafter, the user U1 operates the user terminal 3 to purchase a betting ticket of the predicted race. Specifically, the user U1 selects a betting ticket selection of a betting ticket in the Web page for purchasing a betting ticket of the predicted race. Herein, a betting ticket selection for selecting a horse number is assumed to be selected. Then, the user U1 selects horse numbers depending on the betting ticket selection (step S4). Then, when the user U1 selects a purchase button on the Web page, the user terminal 3 of the user U1 transmits a betting ticket purchase acceptance request to the betting ticket release representation server 1 (step S5). The betting ticket purchase acceptance request contains user ID of the user U1, race ID of race for which a betting ticket is to be purchased, selected betting ticket selection and horse number. Further, the betting ticket purchase acceptance request contains betting ticket ID corresponding to selected betting ticket selection and horse number. When the betting ticket release representation server 1 receives the betting ticket purchase acceptance request, the betting ticket purchase acceptance unit 141 acquires a present date/time as a purchase date/time. The betting ticket purchase acceptance unit 141 generates a betting ticket purchase history containing the information set in the betting ticket purchase acceptance request and the purchase date/time. Then, the betting ticket purchase acceptance unit 141 registers the betting ticket purchase history in the betting ticket purchase history DB 12*f* (step S6).

The user can purchase, for one race, a voting ticket of one kind of promising bet or can purchase voting tickets of multiple kinds of promising bets. In the case where the user purchases voting tickets of multiple kinds of promising bets, the processings in steps S4 to S6 are performed some times, for example. The user can register his/her prediction after purchasing a betting ticket.

On the other hand, the user U2 operates the user terminal 3 to view the prediction display page. At this time, the user U2 selects a race held in the future as a target race. Then, the user terminal 3 of the user U2 transmits a request for the prediction display page (step S7). When the betting ticket release representation server 1 receives the request, the coincidence determination unit 143 determines coincidences between promising bets and prediction per user who predicts a target race based on the betting ticket purchase history and the prediction information (step S8). Then, the reliability determination unit 144 determines reliability per the user who predicted based on the coincidences (step S9). Then, the prediction display control unit 145 generates a prediction display page such that the predictions of the users with high reliability are preferentially displayed ahead of the predictions of the users with low reliability (step S10). The detailed processing contents of steps S8 to 10 will be described after.

Further, the coincidence determination unit 143 and the reliability determination unit 144 may determine a coincidence or reliability of a prediction of the user utilizing the user terminal 3 as a request transmission source when a prediction acceptance request is received or a betting ticket purchase acceptance request is received, and may store a determination result in the storage unit 12 or the like. Then, in the case where the reliability determination unit 144 uses information on whether a betting ticket hits for determining reliability, the reliability determination unit 144 may determine reliability of the user who predicts the race when a final result of the race is out, for example. The prediction display control unit 145 may generate or update the prediction display page based on the stored determination result when coincidence and reliability are determined. Then, the prediction display control unit 145 may transmit the previously generated or updated prediction display page when a request for the prediction display page is received.

The prediction display control unit 145 transmits the generated prediction display page to the user terminal 3 of the user U2 (step S11). The user terminal 3 displays the received prediction display page on the screen (step S12).

Figure 8:
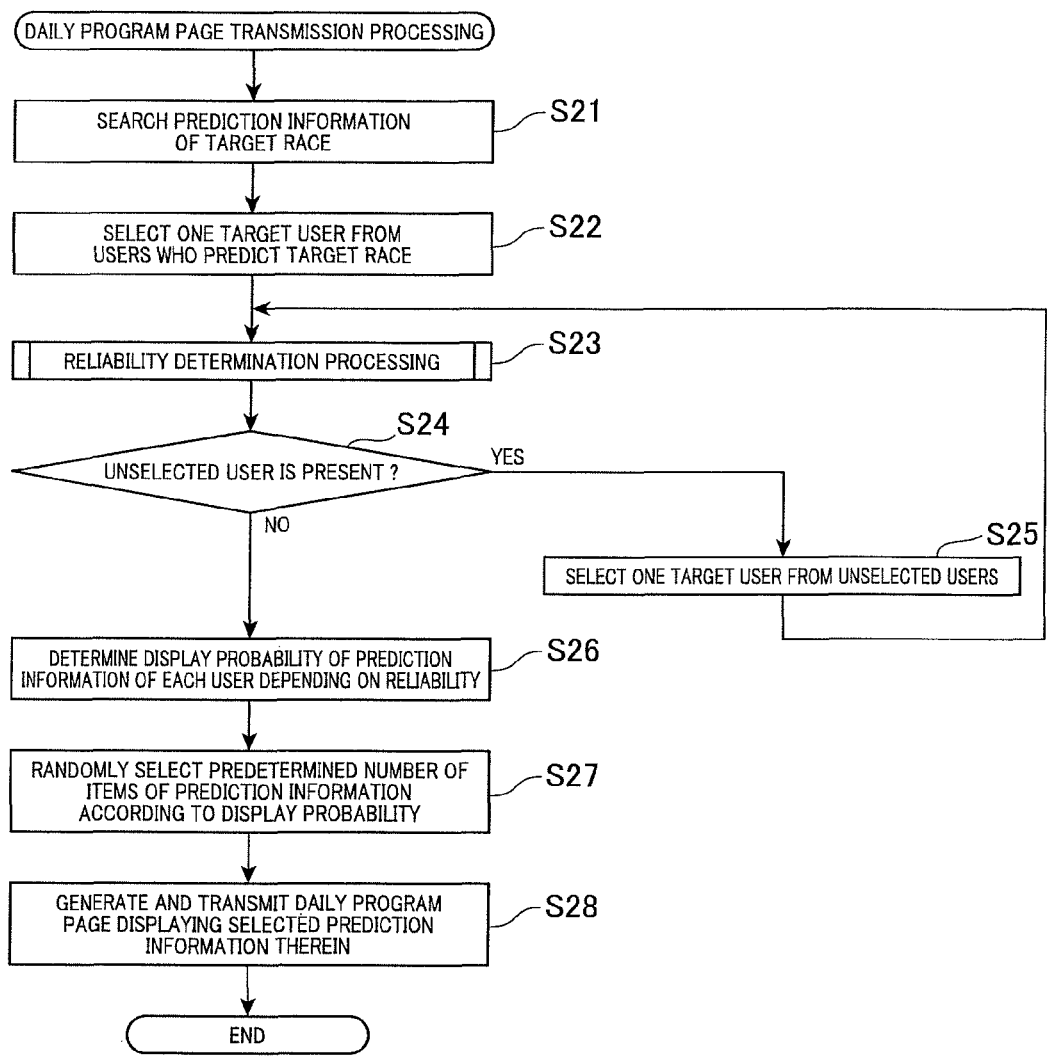
FIG. 8 is a flowchart illustrating one exemplary daily program page transmission processing by a system control unit 14 in the betting ticket release representation server 1 according to one embodiment.

FIG. 8 is a flowchart illustrating an exemplary daily program page transmission processing by the system control unit 14 in the betting ticket release representation server 1 according to the present embodiment. The daily program page transmission processing is started when the betting ticket release representation server 1 receives a request for the daily program page from the user terminal 3.

As illustrated in FIG. 8, the prediction display control unit 145 searches prediction information containing the race ID of a race for which a daily program page is to be displayed from the prediction information DB 12*g* (step S21). Then, the prediction display control unit 145 acquires the user ID from each item of searched prediction information. Thereby, the prediction display control unit 145 specifies the user who predicts the target race. Then, the prediction display control unit 145 selects one of the users who predict the target race as a target user (step S22). Then, the reliability determination unit 144 performs a reliability determination processing (step S23).

Reliability of the target user is determined in the reliability determination processing. The reliability determination processing will be described after in detail.

The prediction display control unit 145 then determines whether an unselected user is present among the users who predict the target race (step S24). At this time, in the case of determining that an unselected user is present (step S24: YES), the prediction display control unit 145 proceeds to step S25. In step S25, the prediction display control unit 145 selects one of the unselected users as a target user. Then, the prediction display control unit 145 proceeds to step S23. On the other hand, in the case of determining that all the users are selected (step S24: NO), the prediction display control unit 145 proceeds to step S26.

In step S26, the prediction display control unit 145 determines a display probability of prediction information of each user depending based on the reliability determined in the reliability determination processing. Specifically, the prediction display control unit 145 increases the display probability as reliability is higher. At this time, the prediction display control unit 145 determines the display probability such that the display probabilities of all the items of prediction information of the target race amount to 100%.

Then, the prediction display control unit 145 randomly selects prediction information displayed in the daily program page from all of the prediction information on the target race based on each determined display probability (step S27). Specifically, the prediction display control unit 145 makes a selection such that prediction information with a higher display probability is more likely to be selected. The prediction display control unit 145 makes as many selections as items of prediction information displayed in the daily program page.

Then, the prediction display control unit 145 generates data for displaying the predictions 110 based on the selected prediction information. Then, the prediction display control unit 145 generates a HTML document containing the data on the predictions 110 as a HTML document of the daily program page. The prediction display control unit 145 transmits the generated HTML document to the user terminal 3 as a request transmission source (step S28). Then, the prediction display control unit 145 terminates the daily program page transmission processing. The user terminal 3 receiving the HTML document displays the daily program page as illustrated in FIG. 6(*a*), for example, based on the HTML document.

Figure 9:
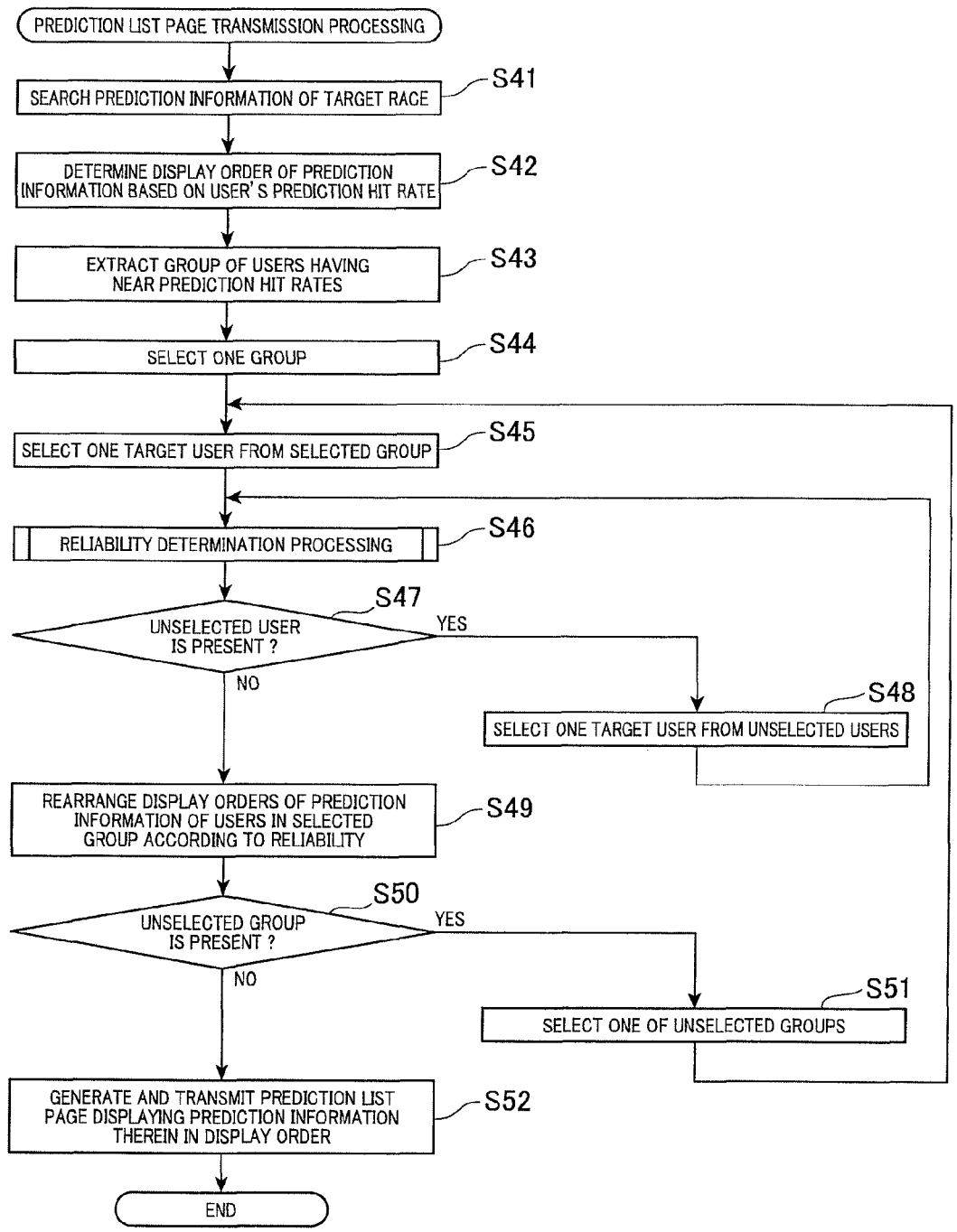
FIG. 9 is a flowchart illustrating one exemplary prediction list page transmission processing by the system control unit 14 in the betting ticket release representation server 1 according to one embodiment.

FIG. 9 is a flowchart illustrating one exemplary prediction list page transmission processing by the system control unit 14 in the betting ticket release representation server 1 according to the present embodiment. The prediction list page transmission processing is started when the betting ticket release representation server 1 receives a request for the prediction list page from the user terminal 3.

As illustrated in FIG. 9, the prediction display control unit 145 searches prediction information containing the race ID of a target race for which a daily program is to be displayed from the prediction information DB 12*g* (step S41). Then, the prediction display control unit 145 determines a display order of each item of searched prediction information based on a prediction hit rate (step S42). Specifically, the prediction display control unit 145 acquires the user ID from each of searched prediction information. Then, the prediction display control unit 145 acquires the prediction hit rate corresponding to the acquired user ID from the member information DB 12*a*. Then, the prediction display control unit 145 rearranges the searched prediction information in descending order of the acquired prediction hit rate.

Then, the prediction display control unit 145 extracts a group of users with equivalent prediction hit rates from the users predicting a target race (step S43). Specifically, the prediction display control unit 145 first assumes that each user predicting the target race is respectively one group. That is, it is assumed that there are as many groups as the number of the users predicting the target race. Then, the prediction display control unit 145 puts two groups with a smallest difference between their prediction hit rates among all the groups into one group. The prediction display control unit 145 repeats this processing until the difference between the prediction hit rates exceeds a threshold. This threshold is within a range in which the prediction hit rates are considered as equivalent. A difference in prediction hit rate between a certain group G1 and a group G2 with a lower prediction hit rate than the group G1 is a difference between the prediction hit rate of a user with the highest prediction hit rate in the group G1 and the prediction hit rate of a user with the lowest prediction hit rate in the group G2.

The prediction display control unit 145 then selects one group from among the extracted groups (step S44). The prediction display control unit 145 then selects one of the users contained in the extracted group as a target user (step S45). Then, the reliability determination unit 144 performs the reliability determination processing (step S46).

Then, the prediction display control unit 145 determines whether an unselected user is present among the users contained in the selected group (step S47). At this time, in the case of determining that an unselected user is present (step S47: YES), the prediction display control unit 145 proceeds to step S48. In step S48, the prediction display control unit 145 selects one of the unselected users as a target user. Then, the prediction display control unit 145 proceeds to step S46. On the other hand, in the case of determining that all the users are selected (step S47: NO), the prediction display control unit 145 proceeds to step S49.

In step S49, the prediction display control unit 145 rearranges a display order of prediction information of each user contained in the selected group depending on reliability determined in the reliability determination processing. Specifically, the prediction display control unit 145 increases a display order of prediction information of a user with higher reliability.

Then, the prediction display control unit 145 determines whether an unselected group is present among the extracted groups (step S50). At this time, in the case of determining that an unselected group is present (step S50: YES), the prediction display control unit 145 proceeds to step S51. In step S51, the prediction display control unit 145 selects one of the unselected groups. Then, the prediction display control unit 145 proceeds to step S45. On the other hand, in the case of determining that all the groups are selected (step S50: NO), the prediction display control unit 145 proceeds to step S52. Further, in the case where a group of users with equivalent prediction hit rates is not extracted in step S43, the processings in steps S44 to S51 are not performed.

In step S52, the prediction display control unit 145 generates data for displaying the predictions 110 based on each of searched prediction information. Then, the prediction display control unit 145 generates a HTML document of the prediction list page such that the predictions 110 are displayed from the top in order of final display order. The prediction display control unit 145 transmits the generated HTML document to the user terminal 3 as a request transmission source. Then, the prediction display control unit 145 terminates the prediction list page transmission processing. The user terminal 3 receiving the HTML document displays the daily program page as illustrated in FIG. 6(*b*), for example, based on the HTML document.

Figure 10:
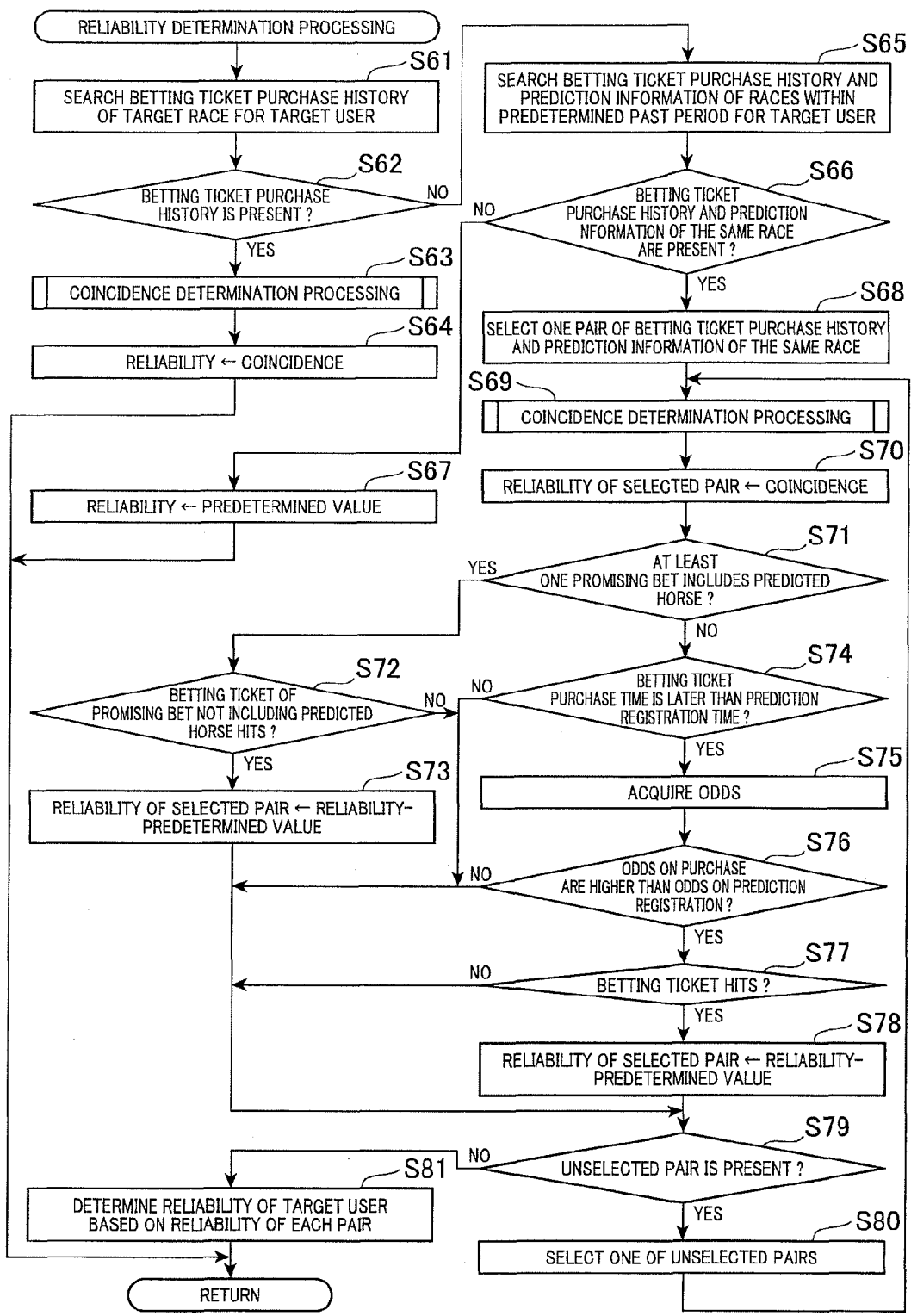
FIG. 10 is a flowchart illustrating one exemplary reliability determination processing by the system control unit 14 in the betting ticket release representation server 1 according to one embodiment.

FIG. 10 is a flowchart illustrating one exemplary reliability determination processing by the system control unit 14 in the betting ticket release representation server 1 according to the present embodiment. As illustrated in FIG. 10, the reliability determination unit 144 searches a betting ticket purchase history of a target race by a target user from the betting ticket purchase history DB 12*f* (step S61). Then, the reliability determination unit 144 determines whether a betting ticket purchase history of a target race by a target user, which is also of a betting ticket selection for selecting a horse number, is present (step S62). At this time, in the case of determining that a betting ticket purchase history is present (step S62: YES), the processing proceeds to step S63. On the other hand, in the case of determining that a betting ticket purchase history is not present (step S62: NO), the reliability determination unit 144 proceeds to step S65.

In step S63, the coincidence determination unit 143 performs the coincidence determination processing. In the coincidence determination processing, a coincidence between a promising bet and a prediction of a target race by a target user is determined. The coincidence determination processing will be described after in detail. Then, the reliability determination unit 144 sets the coincidence determined in the coincidence determination processing for the reliability of the target user (step S64). Then, the reliability determination unit 144 terminates the reliability determination processing.

In step S65, from the betting ticket purchase history DB 12*f*, the reliability determination unit 144 searches betting ticket purchase histories of the races within a predetermined past period from the present time and of the betting ticket selection for selecting a horse number among the betting ticket purchase histories of the target user. Further, the reliability determination unit 144 searches prediction information on the races held within a predetermined past period from the present time among the items of prediction information of the target user from the prediction information DB 12*g*. The races held in the past among all the races are, for example, the races for which the race result information is registered in the race result DB 12*e*.

Then, the reliability determination unit 144 determines whether a betting ticket purchase history and prediction information for the same race are present in the searched betting ticket purchase histories and prediction information (step S66). At this time, in the case of determining that a betting ticket purchase history and prediction information for the same race are not present (step S66: NO), the reliability determination unit 144 proceeds to step S67. In step S67, the reliability determination unit 144 sets a preset value for the reliability of the target user. Then the reliability determination unit 144 terminates the reliability determination processing. On the other hand, in the case of determining that a betting ticket purchase history and prediction information for the same race are present (step S66: YES), the reliability determination unit 144 proceeds to step S68.

In step S68, the reliability determination unit 144 selects one of the pairs of betting ticket purchase history and prediction information for the same race. Further, the user may purchase betting tickets of multiple promising bets for one race. Therefore, a plurality of betting ticket purchase histories of the target user may be present for one race. The coincidence determination unit 143 then performs the coincidence determination processing (step S69). In the coincidence determination processing at this time, a coincidence between a promising bet and a prediction of a past race corresponding to the selected pair is determined. Then, the reliability determination unit 144 sets the coincidence determined in the coincidence determination processing for the reliability of the selected pair (step S70).

Then, the reliability determination unit 144 determines whether at least one promising bet includes at least one predicted horse based on the horse numbers contained in the prediction information of the selected pair and the horse numbers contained in the betting ticket purchase history (step S71). At this time, in the case of determining that at least one promising bet includes the horse number of a predicted horse (step S71: YES), the reliability determination unit 144 proceeds to step S72. On the other hand, in the case of determining that no promising bet includes the horse number of a predicted horse (step S71: NO), the reliability determination unit 144 proceeds to step S74.

In step S72, the reliability determination unit 144 determines whether at least one promising bet not including the horse number of a predicted horse is present and the betting ticket of the promising bet not including the horse number of a predicted horse hits based on the betting ticket purchase history and the prediction information of the selected pair. At this time, the reliability determination unit 144 acquires race result information on the race corresponding to the selected pair from the race result DB 12e. Then, the reliability determination unit 144 determines whether the betting ticket ID of the betting ticket of the promising bet not including a predicted horse is contained in the race result information as the betting ticket ID of the hit betting ticket. In the case of determining that at least one promising bet not including the horse number of a predicted horse is present and the betting ticket of the promising bet not including the horse number of a predicted horse hits (step S72: YES), the reliability determination unit 144 proceeds to step S73. In step S73, the reliability determination unit 144 subtracts the preset setting value from the reliability of the selected pair. The setting value is set such that reliability to be calculated is higher than reliability in complete non-coincidence. Then, the reliability determination unit 144 proceeds to step S79. On the other hand, in the case of determining that a promising bet not including the horse number of a predicted horse is not present or that the betting ticket of the promising bet not including the horse number of a predicted horse does not hit (step S72: NO), the reliability determination unit 144 proceeds to step S79.

In step S74, the reliability determination unit 144 acquires the purchase date/time from the betting ticket purchase history of the selected pair, and acquires the registration date/time from the prediction information of the selected pair. Then, the reliability determination unit 144 determines whether the purchase date/time is later than the registration date/time. In the case where a plurality of betting ticket purchase histories are present, the reliability determination unit 144 determines whether all the purchase date/times are later than the registration date/time, for example. At this time, in the case of determining that the purchase date/times are later than the registration date/time (step S74: YES), the reliability determination unit 144 proceeds to step S75. On the other hand, in the case of determining that the purchase date/times are not later than the registration date/time (step S74: NO), the reliability determination unit 144 proceeds to step S79.

In step S75, the reliability determination unit 144 acquires the odds at the time of the purchase of the betting ticket and the odds at the time of the registration of the prediction. Specifically, the reliability determination unit 144 searches the odds information containing the race IDs and the betting ticket IDs contained in the selected betting ticket purchase history from the odds information DB 12d. Then, the reliability determination unit 144 acquires the odds from the odds information containing an update date/time closest to the purchase date/time of the betting ticket and the odds information containing an update date/time closest to the registration date/time of the prediction among the searched odds information.

Then, the reliability determination unit 144 determines whether the odds at the time of the purchase of the betting ticket are higher than the odds at the time of the registration of the prediction (step S76). In the case where a plurality of betting ticket purchase histories are present, the reliability determination unit 144 determines, for example, whether the odds at the time of the purchase are higher than the odds at the time of the registration of the prediction for all the betting tickets. At this time, in the case of determining that the odds at the time of the purchase of the betting ticket are higher than the odds at the time of the registration of the prediction (step S76: YES), the reliability determination unit 144 proceeds to step S77. On the other hand, in the case of determining that the odds at the time of the purchase of the betting ticket are not higher than the odds at the time of the registration of the prediction (step S76: NO), the reliability determination unit 144 proceeds to step S79.

In step S77, the reliability determination unit 144 determines whether the betting ticket hits. Specifically, the reliability determination unit 144 determines whether the betting ticket ID contained in the purchase history of the selected pair is contained in the race result information as the betting ticket ID of the hit betting ticket in the race result information of the race corresponding to the selected pair. In the case where a plurality of betting ticket purchase histories are present, the reliability determination unit 144 determines whether at least one betting ticket hits, for example. In the case of determining that the betting ticket hits (step S77: YES), the reliability determination unit 144 proceeds to step S78. In step S78, the reliability determination unit 144 subtracts a predetermined value from the reliability of the selected pair. Then, the reliability determination unit 144 proceeds to step S79. On the other hand, in the case of determining that the betting ticket does not hit (step S77: NO), the reliability determination unit 144 proceeds to step S79. In the case of determining that the odds at the time of the purchase of the betting ticket are higher than the odds at the time of the registration of the prediction (step S76: YES), the reliability determination unit 144 may omit the determination in step S77 and perform step S78.

In step S79, the reliability determination unit 144 determines whether an unselected pair is present among the pairs of betting ticket purchase history and prediction information of the same race. At this time, in the case of determining that an unselected pair is present (step S79: YES), the processing proceeds to step S80. In step S80, the reliability determination unit 144 selects one of the unselected pairs. Then, the reliability determination unit 144 proceeds to step S69. On the other hand, in the case of determining that all the pairs are selected (step S79: NO), the reliability determination unit 144 proceeds to step S81.

In step S81, the reliability determination unit 144 determines reliability of the target user based on the reliability of each pair of betting ticket purchase history and prediction information of the same race. For example, the reliability determination unit 144 calculates an average value of reliability of each of the pairs. Then, the reliability determination unit 144 terminates the reliability determination processing.

Figure 11:
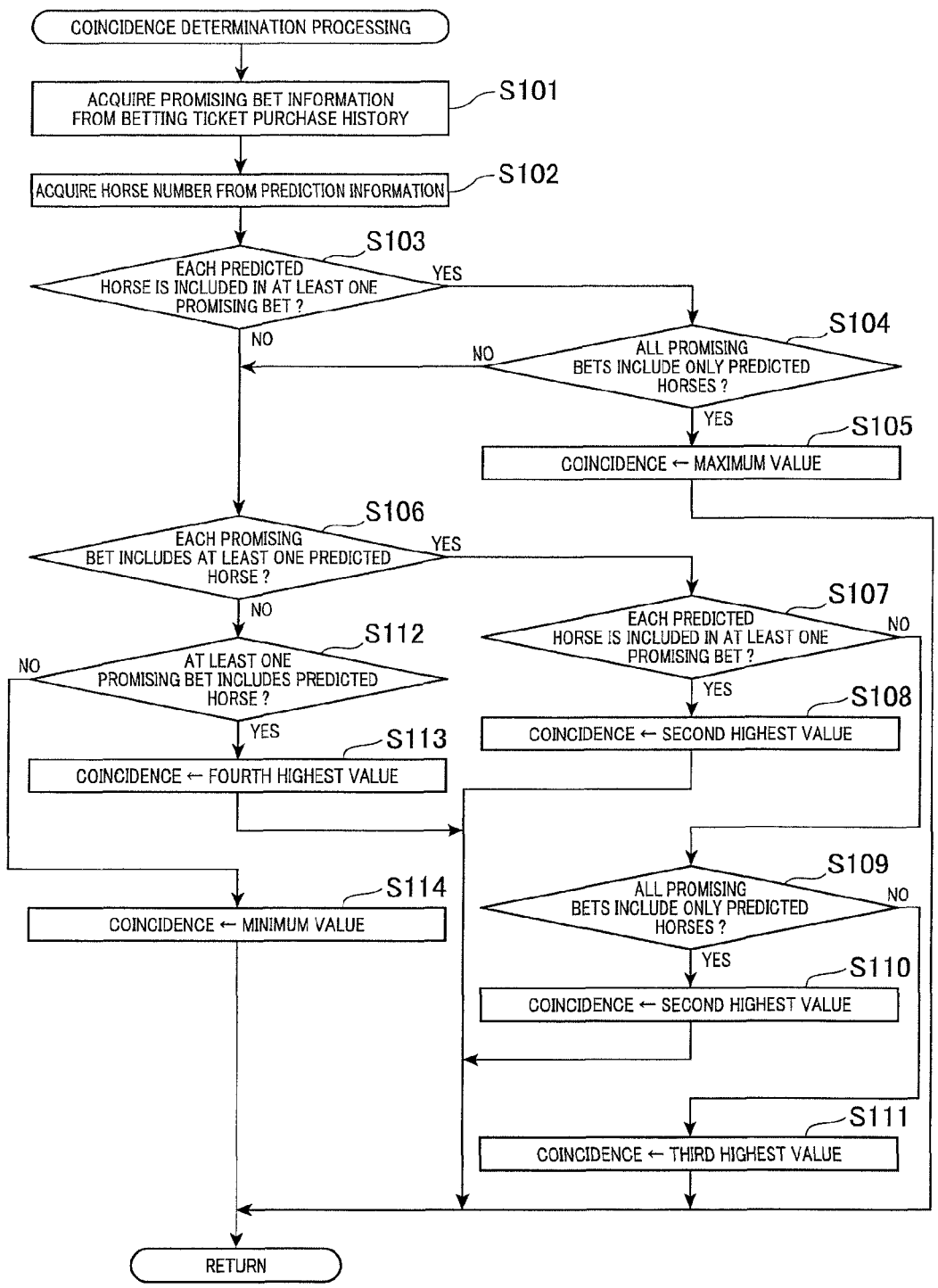
FIG. 11 is a flowchart illustrating one exemplary coincidence determination processing by the system control unit 14 in the betting ticket release representation server 1 according to one embodiment.

FIG. 11 is a flowchart illustrating one exemplary coincidence determination processing by the system control unit 14 in the betting ticket release representation server 1 according to the present embodiment. As illustrated in FIG. 11, the coincidence determination unit 143 acquires the horse numbers of promising bets from the betting ticket purchase history (step S101), and acquires the horse numbers of predicted horses from the prediction information (step S102). The coincidence determination unit 143 performs the subsequent determination processing based on the acquire horse numbers.

Then, the coincidence determination unit 143 determines whether each of all the horse numbers of the predicted horses is included in at least one promising bet (step S103). At this time, in the case of determining that each of all the horse numbers of the predicted horses is included in at least one promising bet (step S103: YES), the coincidence determination unit 132 proceeds to step S104. On the other hand, in the case of determining that the horse number of at least one predicted horse is not included in any promising bet (step S103: NO), the coincidence determination unit 143 proceeds to step S106.

In step S104, the coincidence determination unit 143 determines whether all the promising bets include only the horse numbers of the predicted horses. At this time, in the case of determining that all the promising bets include only the horse numbers of the predicted horses (step S104: YES), the coincidence determination unit 143 proceeds to step S105. In step S105, the coincidence determination unit 143 sets the coincidence at the maximum value as the coincidence. Then, the coincidence determination unit 143 terminates the coincidence determination processing. On the other hand, in the case of determining that at least one promising bet including the horse number of at least one participating horse different from the predicted horses is present (step S104: NO), the coincidence determination unit 143 proceeds to step S106.

In step S106, the coincidence determination unit 143 determines whether each of all the promising bets includes the horse number of at least one predicted horse. At this time, in the case of determining that each of all the promising bets includes the horse number of at least one predicted horse (step S106: YES), the coincidence determination unit 143 proceeds to step S107. On the other hand, in the case of determining that at least one promising bet does not include the horse number of a predicted horse (step S106: NO), the coincidence determination unit 143 proceeds to step S112.

In step S107, the coincidence determination unit 143 determines whether each of all the horse numbers of the predicted horses is included in at least one promising bet. At this time, in the case of determining that each of all the horse numbers of the predicted horses is included in at least one promising bet (step S107: YES), the coincidence determination unit 143 proceeds to step S108. In step S108, the coincidence determination unit 143 sets the coincidence at the second highest value as the coincidence. Then, the coincidence determination unit 143 terminates the coincidence determination processing. On the other hand, in the case of determining that the horse number of at least one predicted horse is not included in any promising bet (step S107: NO), the coincidence determination unit 143 proceeds to step S109.

In step S109, the coincidence determination unit 143 determines whether all the promising bets include only the horse numbers of the predicted horses. At this time, in the case of determining that all the promising bets include only the horse numbers of the predicted horses (step S109: YES), the coincidence determination unit 143 proceeds to step S110. In step S110, the coincidence determination unit 143 sets the coincidence at the second highest value as the coincidence. Then, the coincidence determination unit 143 terminates the coincidence determination processing. On the other hand, in the case of determining that at least one promising bet includes the horse number of a participating horse different from the predicted horses (step S109: NO), the coincidence determination unit 143 proceeds to step S111. In step S111, the coincidence determination unit 143 sets the coincidence at the third highest value as the coincidence. Then, the coincidence determination unit 143 terminates the coincidence determination processing.

In step S112, the coincidence determination unit 143 determines whether at least one promising bet includes the horse number of at least one predicted horse. At this time, in the case of determining that at least one promising bet includes the horse number of at least one predicted horse (step S112: YES), the coincidence determination unit 143 proceeds to step S113. In step S113, the coincidence determination unit 143 sets the coincidence at the fourth highest value as the coincidence. Then, the coincidence determination unit 143 terminates the coincidence determination processing. On the other hand, in the case of determining that no promising bet includes the horse number of a predicted horse (step S112: NO), the coincidence determination unit 143 proceeds to step S114. In step S114, the coincidence determination unit 143 sets the coincidence at the minimum value as the coincidence. The coincidence determination unit 143 then terminates the coincidence determination processing.

As described above, according to the present embodiment, the system control unit 14 accepts user's purchase of a betting ticket for betting a participating horse participating in a race, accepts user's prediction of the race for which purchase of a betting ticket is accepted and which includes a user-predicted participating horse, determines a coincidence between a promising bet of the participating horse of the betting ticket whose purchase is accepted and the accepted prediction per the users who predicted, and determines which user's prediction among the users who predict is preferentially presented ahead of other users. Thereby, the predictions helpful to the users viewing the predictions can be preferentially presented.

Further, the system control unit 14 may determine reliability of the users who predicted based on the coincidences determined by the promising bets of the betting tickets and the predictions of the past races, may increase reliability for a higher coincidence, and may preferentially present predictions of users with high reliability among the users whose reliability is determined ahead of predictions of other users in the case where information on the predictions of a race started in the future is presented. Thereby, even if the user who predicts a race started in the future does not purchase a betting ticket of the race, the predictions helpful to the users viewing the predictions can be preferentially presented.

Further, in the case where all of one or more participating horses included in a promising bet of each of one or more purchased betting tickets are included in one or more predicted participating horses and each of one or more predicted participating horses is included in at least any promising bet of one or more purchased betting tickets, a coincidence may be increased. Thus, the prediction of the user who purchases the betting ticket can be most preferentially presented.

Further, when at least one of one or more predicted participating horses is included in each promising bet of one or more purchased betting tickets, the system control unit 14 may increase coincidence in the any case of the case that all of one or more participating horses included in each promising bet of one or more purchased betting tickets are included in one or more predicted participating horses and of the case that each of one or more predicted participating horses is included in at least any promising bet of one or more purchased betting tickets than other cases. Thereby, the predictions with users' stronger wills of making a great prediction can be preferentially presented among the predictions which may have users' wills of making a certain prediction.

Further, the system control unit 14 may acquire a purchase date/time of a betting ticket and a registration date/time of a prediction, may acquire odds at the time of purchase of a betting ticket and odds at the time of acceptance of a prediction, and, when a promising bet of a purchased betting ticket does not include any predicted participating horse, may lower reliability in the case where a betting ticket is purchased after a prediction is accepted and odds of the betting ticket at the time of the purchase are higher than odds of the betting ticket at the time of the acceptance of the prediction than other cases. Thereby, other predictions can be preferentially presented ahead of a prediction of a user who has probability to intentionally increase the odds of a betting ticket which he/she purchases.

At this time, the system control unit 14 may lower reliability in the case where a betting ticket is purchased after a prediction is accepted and the betting ticket for which odds at the time of purchase are higher than odds at the time of acceptance of the prediction hits than in the case where the betting ticket does not hit. Thereby, other predictions can be preferentially presented ahead of a prediction of a user who has probability to intentionally increase the odds of the betting ticket which he/she purchases and to make a bad prediction.

Further, in the case where all promising bets include a predicted horse, the coincidence determination unit 143 may increase a coincidence as a rate at which the horse numbers of predicted horses are included in the promising bets of one or more purchased betting tickets is higher. This is because as the rate at which the horse numbers of predicted horses are included in the promising bets of the betting tickets is higher, the user is considered as having a will of making a great prediction. At this time, the coincidence determination unit 143 determines reliability lower than reliability in complete coincidence, and determines reliability higher than reliability in the case where partial promising bets do not include a predicted horse.

In the example of FIG. 4(b), eight horse numbers among ten horse numbers of all promising bets are the horse numbers of predicted horses. Thus, the rate is 80%. In the example of FIG. 4(c), all the four house numbers of promising bets are the horse numbers of predicted horses. Thus, the rate is 100%. In the example of FIG. 4(d), three horse numbers among all the four horse numbers of promising bets are the horse numbers of predicted horses. Thus, the rate is 75%. Thus, the coincidences of FIG. 4(c), FIG. 4(b) and FIG. 4(d) are higher in this order.

Figure 12:
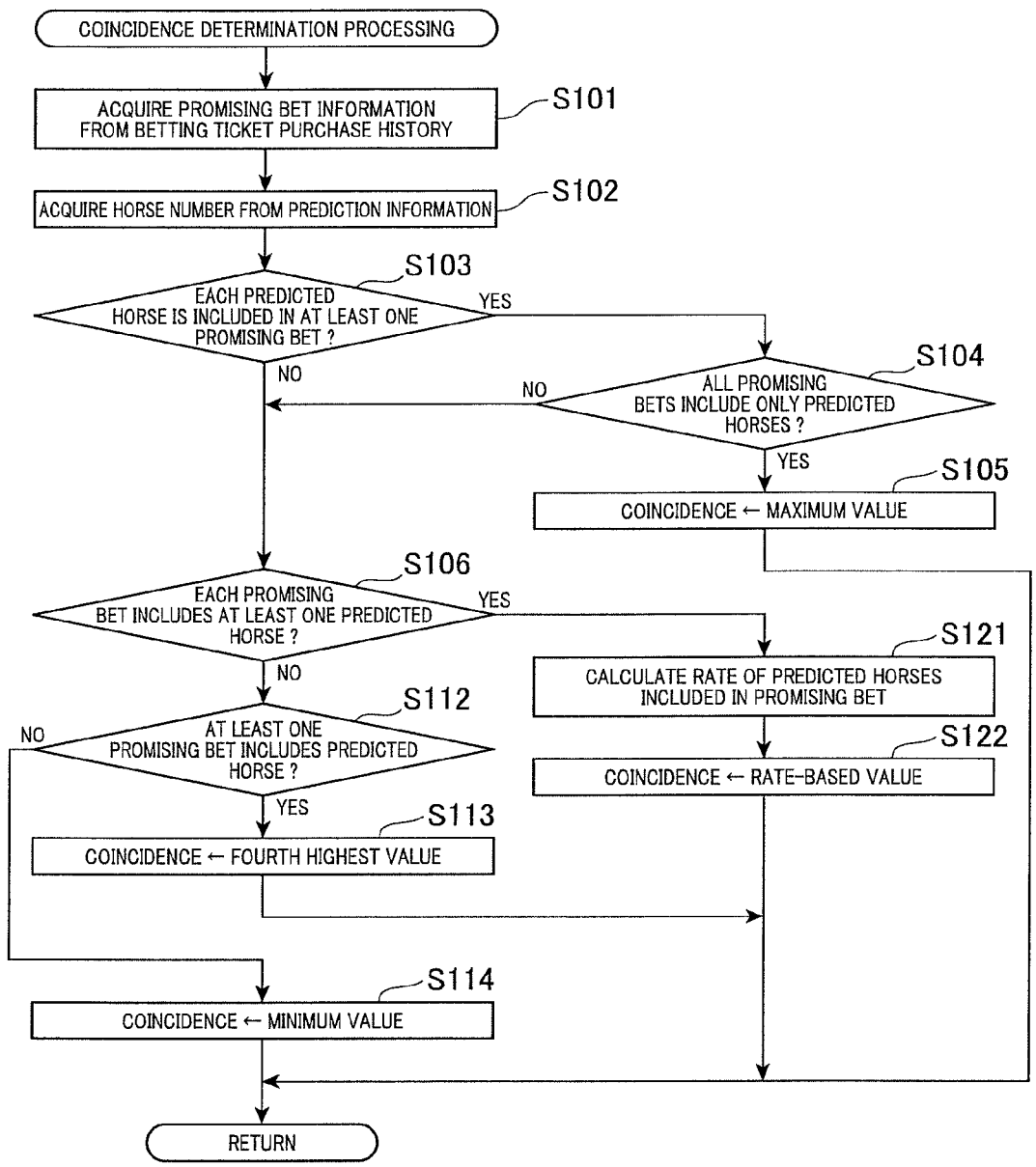
FIG. 12 is a flowchart illustrating one exemplary coincidence determination processing by the system control unit 14 in the betting ticket release representation server 1 according to one embodiment.

FIG. 12 is a flowchart illustrating one exemplary coincidence determination processing by the system control unit 14 in the betting ticket release representation server 1 according to the present embodiment. In FIG. 12, like reference numerals are denoted to similar processings as in FIG. 11. As illustrated in FIG. 12, steps S101 to 106 and S112 to S114 are performed similarly as in FIG. 11. In step S106, in the case where determining that each of all promising bets includes the horse number of at least one predicted horse (step S106: YES), the coincidence determination unit 143 proceeds to step S121. In step S121, the coincidence determination unit 143 calculates a rate at which the horse number of a predicted horse is included in promising bets of one or more betting tickets. Then, the coincidence determination unit 143 sets the coincidence at a value depending on the calculated rate (step S122). Then, the coincidence determination unit 143 terminates the coincidence determination processing.

In the above embodiment, the information processing apparatus according to the present invention is applied to the server apparatus in the client server system. However, the information processing apparatus according to the present invention may be applied to an information processing apparatus other than the server apparatus. For example, the information processing apparatus according to the present invention may be applied to the user terminal 3 and the like. Then, the control unit provided in the information processing apparatus functions as the means according to the present invention, and thus the control unit may cause a display means such as display to present predictions according to the present invention. In this case, the display means may be provided in the information processing apparatus. Alternatively, the display means may be a separate device from the information processing apparatus.

DESCRIPTION OF REFERENCE NUMERALS

1: Betting ticket release representation server
2: Organizer source server
3: User terminal
11: Communication unit
12: Storage unit
12a: Member information DB
12b: Race information DB
12c: Betting ticket information DB
12d: Odds information DB
12e: Race result DB
12f: Betting ticket purchase history DB
12g: Prediction information DB
13: I/O interface
14: System control unit
14a: CPU
14b: ROM
14c: RAM
15: System bus
141: Betting ticket purchase acceptance unit
142: Prediction acceptance unit
143: Coincidence determination unit
144: Reliability determination unit
145: Prediction display control unit
NW: Network S: Information processing system

The invention claimed is:

1. An information processing apparatus comprising:
   at least one memory operable to store program code;
   at least one processor operable to read the program code and operate as instructed by the program code, the program code including:
      purchase acceptance code configured to cause the at least one processor to accept dopester's purchase of a voting ticket for voting a participant participating in a future race;
      prediction acceptance code configured to cause the at least one processor to accept a prediction of the dopester for the future race for which purchase of a voting ticket is accepted by the purchase acceptance code, the prediction including a participant predicted by the dopester;
      coincidence determination code configured to cause the at least one processor to determine, per dopester, a coincidence between a promising bet of a participant of a voting ticket whose purchase has been accepted by the purchase acceptance code for at least one past race and a prediction which has been accepted by the prediction acceptance code for the at least one past race; and
      presentation control code configured to cause the at least one processor to, in response to a request from a terminal of a third party, transmit, to the terminal of the third party, a web page containing a list of a preset number of predictions of respective dopesters for the future race in a descending order of coincidence determined by the coincidence determination code,
   wherein a prediction, for the future race, of a first dopester having a higher coincidence determined by the coincidence determination code for the at least one past race has a higher display ranking in the list than a prediction, for the future race, of a second dopester having a lower coincidence determined by the coincidence determination code for the at least one past race.

2. The information processing apparatus according to claim 1, further comprising a reliability determination code causes the at least one processor to determine reliability of a dopester based on coincidences determined by the coincidence determination code based on promising bets and predictions of voting tickets of past races, and that increases reliability as the coincidence is higher,
   wherein, in the case where information on predictions of a race started in the future is presented, the presentation control code causes the at least one processor to preferentially present a prediction of the dopester with higher reliability out of the first dopester and the second dopester whose reliability is determined by the reliability determination code ahead of a prediction of the other dopester.

3. The information processing apparatus according to claim 1 or claim 2,
   wherein, in the case where all of one or more participants included in a promising bet of each of one or more purchased voting tickets are included in one or more predicted participants and each of one or more predicted participants is included in at least any promising bet of one or more purchased voting tickets, the coincidence determination code causes the at least one processor to increase the coincidence up to the highest.

4. The information processing apparatus according to claim 1,
   wherein when at least one of one or more predicted participants is included in a promising bet of each of one or more purchased voting tickets, the coincidence determination code causes the at least one processor to increase the coincidence in any case of a case that all of one or more participants included in a promising bet of each of one or more purchased voting tickets are included in one or more predicted participants and a case that each of one or more predicted participants is included in at least any promising bet of one or more purchased voting tickets than other cases.

5. The information processing apparatus according to claim 1,
   wherein when at least one of one or more predicted participants is included in a promising bet of each of one or more purchased voting tickets, the coincidence determination code causes the at least one processor to increase the coincidence as a rate at which one or more predicted participants are included in promising bets of one or more purchased voting tickets is higher.

6. The information processing apparatus according to claim 2, further comprising:
   time acquisition code configured to cause the at least one processor to acquire a voting ticket purchase time and a prediction acceptance time; and
   odds acquisition code configured to cause the at least one processor to acquire odds at the time of the voting ticket purchase and odds at the time of the prediction acceptance,
   wherein when a promising bet of a purchased voting ticket does not include any one or more predicted participants, the reliability determination code causes the at least one processor to lower the reliability in the case where a voting ticket is purchased after a prediction is accepted and that odds of the voting ticket at the time of the purchase are higher than odds of the voting ticket at the time of the prediction acceptance than other cases.

7. The information processing apparatus according to claim 6,
   wherein the reliability determination code causes the at least one processor to lower the reliability in the case where a voting ticket which is purchased after a prediction is accepted and whose odds at the time of the purchase are higher than odds at the time of the prediction acceptance hits than in the case where the voting ticket does not hit.

8. An information processing method performed by a computer, the method comprising:
   accepting dopester's purchase of a voting ticket for voting a participant participating in a future race;
   accepting a prediction of the dopester for the future race for which purchase of a voting ticket has been accepted, the prediction including a participant predicted by the dopester;
   determining, per dopester, a coincidence between a promising bet of a participant of a voting ticket whose purchase and prediction have been accepted for at least one past race; and
   in response to a request from a terminal of a third party, transmitting, to the terminal of the third party, a web page containing a list of a preset number of predictions of respective dopesters for the future race in a descending order of determined coincidence,
   wherein a prediction, for the future race, of a first dopester having a higher coincidence determined for the at least one past race has a higher display ranking in the list than a prediction, for the future race, of a second dopester having a lower coincidence determined for the at least one past race.

9. A non-transitory recording medium in which an information processing program is recorded, the information processing program causing a computer to:
accept dopester's purchase of a voting ticket for voting a participant participating in a race;
accept a prediction of the dopester for a race for which purchase of a voting ticket is accepted, the prediction including a participant predicted by the dopester;
determine, per dopester, a coincidence between a promising bet of a participant of a voting ticket whose purchase has been accepted and a prediction accepted by the prediction acceptance means; and
in response to a request from a terminal of a third party, transmitting, to the terminal of the third party, a web page containing a list of a preset number of predictions of respective dopesters for the future race in a descending order of determined coincidence,
wherein a prediction, for the future race, of a first dopester having a higher coincidence determined for the at least one past race has a higher display ranking in the list than a prediction, for the future race, of a second dopester having a lower coincidence determined for the at least one past race.

* * * * *